(12) United States Patent
Moon et al.

(10) Patent No.: US 12,474,463 B2
(45) Date of Patent: Nov. 18, 2025

(54) TRACKING A TARGET USING DOPPLER SHIFT

(71) Applicants: Todd Moon, Providence, UT (US); Thomas Bradshaw, Albuquerque, NM (US)

(72) Inventors: Todd Moon, Providence, UT (US); Thomas Bradshaw, Albuquerque, NM (US)

(73) Assignee: Utah State University, Logan, UT (US)

( * ) Notice: Subject to any disclaimer, the term of this patent is extended or adjusted under 35 U.S.C. 154(b) by 372 days.

(21) Appl. No.: 18/212,344

(22) Filed: Jun. 21, 2023

(65) Prior Publication Data
US 2024/0183969 A1    Jun. 6, 2024

Related U.S. Application Data

(63) Continuation-in-part of application No. 17/332,556, filed on May 27, 2021, now abandoned.
(Continued)

(51) Int. Cl.
*G01S 13/72* (2006.01)
*G01S 13/87* (2006.01)

(52) U.S. Cl.
CPC .......... *G01S 13/723* (2013.01); *G01S 13/878* (2013.01)

(58) Field of Classification Search
CPC .... G01S 13/723; G01S 13/878; G01S 13/347; G01S 13/003
See application file for complete search history.

(56) References Cited

U.S. PATENT DOCUMENTS

| 4,670,757 A | 6/1987 | Munich et al. |
| 4,746,924 A | 5/1988 | Lightfoot |

(Continued)

FOREIGN PATENT DOCUMENTS

| EP | 2151697 A2 | 2/2010 |
| WO | 2015063488 A1 | 5/2015 |

OTHER PUBLICATIONS

Bradshaw, Thomas L., "Alternative Doppler Extraction for Indoor Communication Signals" (2021 ). All Graduate Theses and Dissertations. 8111. https://digitalcommons.usu.edu/etd/8111; cited in IDS (Year: 2021).*

(Continued)

*Primary Examiner* — William Kelleher
*Assistant Examiner* — Juliana Cross
(74) *Attorney, Agent, or Firm* — Kunzler Bean & Adamson; Scott D. Thorpe

(57) ABSTRACT

For tracking a target, a method receives a combined signal comprising a target signal reflected by a target and a transmitter signal not reflected by the target, wherein the transmitter signal is comprised of a plurality of orthogonal frequency division multiplexing (OFDM) subcarrier signals. The method calculates a signal Fourier transform for the combined signal to obtain the complex symbols. The method estimates a sequence of channel state information. The method estimates CSI over for non-pilot OFDM subcarriers of the combined signal to obtain CSI for a sequence of M OFDM symbols. The method computes a CSI Fourier transform for the sequence of CSI for a plurality of OFDM subcarriers. The method estimates a CSI Doppler frequency by matching a Fourier transform template to the CSI Fourier transform. The method computes each of a target position and a target velocity vector for the target.

20 Claims, 20 Drawing Sheets

Related U.S. Application Data

(60) Provisional application No. 63/030,813, filed on May 27, 2020.

(56) References Cited

U.S. PATENT DOCUMENTS

| | | |
|---|---|---|
| 5,252,980 A | 10/1993 | Gray et al. |
| 7,826,549 B1 | 11/2010 | Aggarwal |
| 9,335,409 B2 | 5/2016 | Abatzoglou et al. |
| 10,310,066 B1 | 6/2019 | Zatman et al. |
| 2006/0115011 A1* | 6/2006 | Tsuruta ................ H04B 7/0857 375/260 |
| 2017/0074980 A1 | 3/2017 | Adib et al. |
| 2019/0178985 A1 | 6/2019 | Roh |
| 2019/0285743 A1 | 9/2019 | Kaino |
| 2020/0247401 A1 | 8/2020 | Yao et al. |
| 2024/0142623 A1* | 5/2024 | Russo ................ G01S 7/4811 |
| 2024/0192311 A1* | 6/2024 | Sakhnini ............. G01S 13/003 |

OTHER PUBLICATIONS

U.S. Appl. No. 17/332,556, "Office Action Summary", USPTO, Dec. 22, 2022, pp. 1-36.

Bradshaw, "Alternative Doppler Extraction for Indoor Communication Signals", Utah State University, All Graduate Theses and Dissertations, Aug. 2021, pp. 1-217.

Peabody et al., "Through-Wall Imaging Radar", Lincoln Laboratory Journal, 2012, pp. 62-72, vol. 19, No. 1, Massachusetts Institute of Technology, Cambridge, USA.

Karanam et al., "3D Through-Wall imaging with Unmanned Aerial Vehicles Using Wifi", IPSN 2017, Apr. 2017, Pittsburgh, USA.

Zhong et al., "Through-the-Wall Imaging Exploiting 2.4GHz Commodity Wi-Fi", IEEE.

* cited by examiner

210

| Doppler Frequency 201 |
| Doppler Shift 203 |
| Transmitter Position 207 |
| Transmitter Velocity Vector 109 |
| Transmitter Signal Characteristics 211 |
| Receiver Position 209 |
| Receiver Velocity Vector 117 |
| Carrier Offset Frequency 213 |
| Spectral Estimation Algorithm 215 |
| Sign Estimation Algorithm 217 |
| Processed Signal 219 |
| Channel State Information 221 |
| OFDM Symbol Index 227 |
| Pilot Subcarrier index 228 |
| Signal Fourier Transform 229 |
| CSI Fourier Transform 231 |
| CSI Doppler Frequency 233 |

| 241 | CSI 221 | CSI Fourier 231 | CSI Doppler 233 | Position/Velocity 205/103 |
|---|---|---|---|---|
| 241 | CSI 221 | CSI Fourier 231 | CSI Doppler 233 | Position/Velocity 205/103 |
| 241 | CSI 221 | CSI Fourier 231 | CSI Doppler 233 | Position/Velocity 205/103 |

Central Lobe Template
125

Side Lobe Template
127

Mean CSI Fourier Transform
131

Fourier Transform Model
133

FIG. 2E

TRACKING A TARGET USING DOPPLER SHIFT

CROSS-REFERENCE TO RELATED APPLICATIONS

This application is a continuation-in-part application of and claims priority to U.S. patent application Ser. No. 17/332,556 entitled "TRACKING A TARGET USING DOPPLER SHIFT" and filed on May 27, 2021 for Todd Moon, which is incorporated by reference.

BACKGROUND INFORMATION

The subject matter disclosed herein relates to tracking a target and more particularly relates to tracking a target using Doppler shift. A target location may be needed.

BRIEF DESCRIPTION

A method of tracking a target is disclosed. The method receives a combined signal comprising a target signal reflected by a target and a transmitter signal not reflected by the target, wherein the transmitter signal is comprised of a plurality of orthogonal frequency division multiplexing (OFDM) subcarrier signals. The method calculates a signal Fourier transform for the combined signal to obtain the complex symbols $z_m[n]$, where where n is the pilot subcarrier index, m is an OFDM symbol index. The method estimates a sequence of channel state information (CSI) $c_{m,n}$ for pilot indices of the pilot subcarrier index for the OFDM subcarrier signals of the combined signal as $$\hat{c}_{m,n} = \left(\frac{z_m[n]}{\text{pilot}_m[n]}\right).$$

The method estimates CSI over for non-pilot OFDM subcarriers of the combined signal to obtain CSI for a sequence of M OFDM symbols. The method computes a CSI Fourier transform for the sequence of CSI for a plurality of OFDM subcarriers. The method estimates a mean Fourier transform by averaging the CSI Fourier transform of the CSI over at least one OFDM subcarriers. The method estimates a CSI Doppler frequency by matching a Fourier transform template to the CSI Fourier transform. The method computes each of a target position and a target velocity vector for the target within a field of interest from the CSI Doppler frequency. An apparatus and computer program product is also disclosed.

BRIEF DESCRIPTION OF DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a schematic block diagram illustrating one embodiment of a transmitter/receiver pair;

FIG. 2D is a schematic block diagram illustrating one embodiment of a data sequence;

FIG. 2E is a schematic block diagram illustrating one embodiment of Fourier transform templates;

DETAILED DESCRIPTION

Figure 1A:
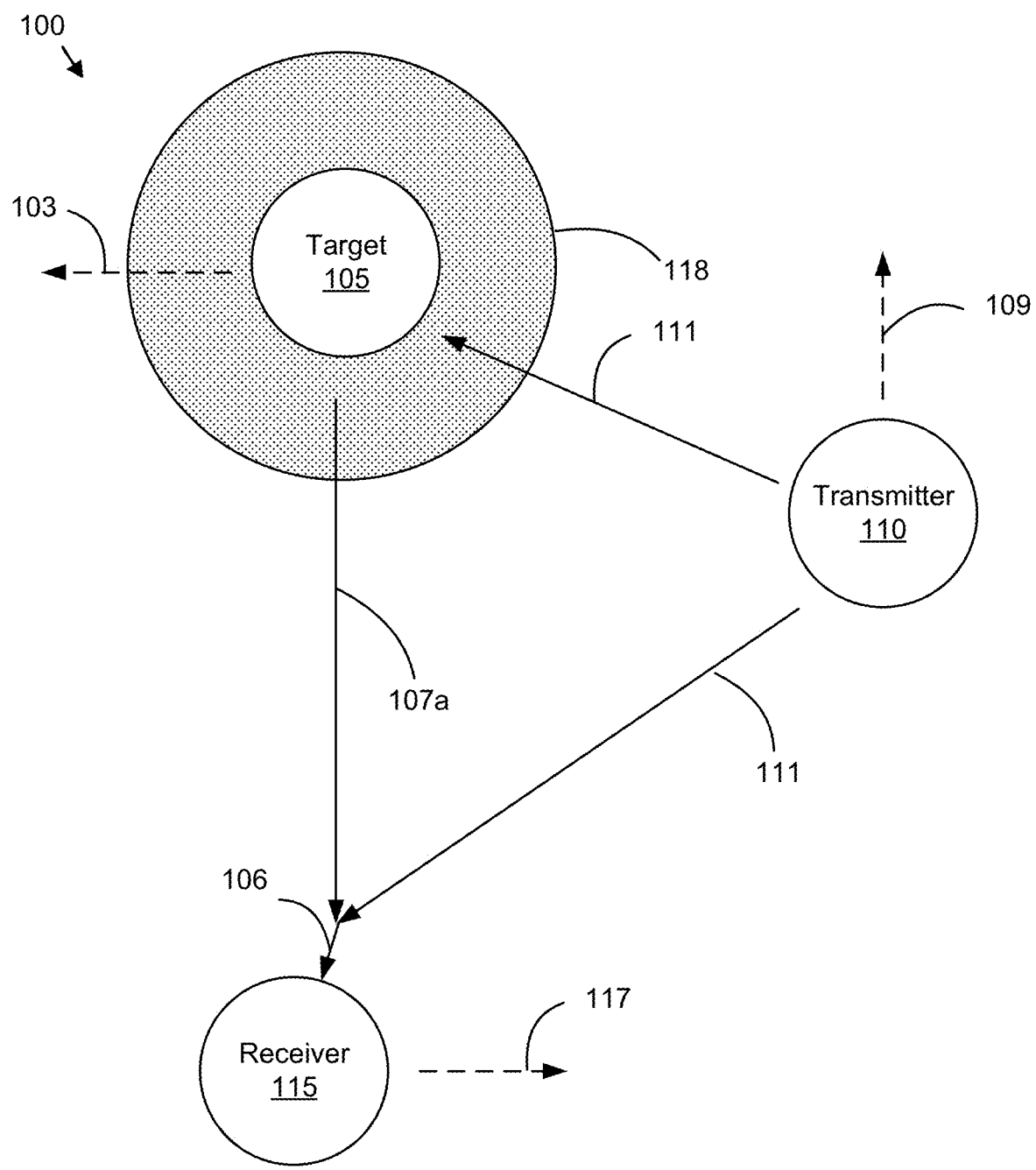
FIG. 1A is a schematic block diagram illustrating one embodiment of a target system.

It will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object-oriented programming language such as Python, Ruby, R, Java, Java Script, Smalltalk, C++, C sharp, Lisp, Clojure, PHP, Matlab, or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus, or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

The transmitter may be a mobile telephone network. The transmitter may also employ a WiFi network based on any one of the Institute of Electrical and Electronics Engineers (IEEE) 802.11 standards. Alternatively, the transmitter may be a BLUETOOTH® connection. In addition, the transmitter may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the transmitter may employ a ZigBee connection based on the IEEE 802 standard. Alternatively, the transmitter may be a cellular telephone network communication. All standards and/or connection types include the latest version and revision of the standard and/or connection type as of the filing date of this application.

Moon, Todd, "Indoor Target Detection and Tracking using WiFi Signals" is incorporated herein by reference. Moon, Todd, "Tracking a Moving Target Using Doppler Shift" Utah State University, Apr. 22, 2020, is incorporated herein by reference. Bradshaw, Thomas, "Alternative Doppler Extraction for Indoor Communication Signals" Utah State University, Apr. 30, 2020, is incorporated herein by reference.

The problem of locating and tracking a target is one which has been widely explored. For example, in a setting using mobile robots, it is desirable for the robot to know its position, and for devices or humans which interact with the robot to know its position. Locating and tracking airplanes has a long history, using for example, any of several different modalities of radar. Geolocation on the earth, using for example the GPS system, is another example of locating.

Several different methods have been developed to perform geolocation. For example, Time of Arrival (TOA) techniques, such as GPS location, make use of signals transmitted from specialized satellites and the time differences from several satellites to the receiver to identify position. This requires a sophisticated satellite infrastructure and precisely controlled timing information. Another method of location, generally referred to as time difference of arrival (TDOA) makes use of time differences of a signal at different receivers. In TDOA, the time difference of a transmitted signal received at two receivers determines a locus of points where the transmitter could be. By employing multiple pairs of transmitters, the transmitter location can be determined. This technique, however, requires precise synchronization between the transmitters. Received signal strength can be used as a method of location. Since the strength of a received signal decreases with the distance from the transmitter, the received signal strength at several receivers can be used to determine the location of a transmitter. Direction of arrival (DOA) methods employ the ability of a receiver to determine the direction from which a transmitted signal arrives, such as using an antenna array. All of these methods require that the target transmit a signal. A different approach to location is to actively query the location of the target using an approach such as radar or (in an acoustic setting) sonar.

The method of the embodiments differs from the techniques summarized above because it does not require the target to transmit any signal, nor does it require active querying as in radar. Instead, the method makes use of radio (or in an acoustic setting, sound) signals already present in the vicinity of the target. These signals might come, for example, from a Wi-Fi transmitter or a radio station. Because this makes use of a signal transmitter at a location different from the receivers, it may be viewed as a form of bi-static radar. However, this does not require that the transmitted signal be designed for particular radar purposes, but may use a variety of incident signals. The method makes use of Doppler changes in the received signal due to motion between the target and the receivers.

An advantage of the embodiments is that they do not require that the receivers by closely synchronized. While information is shared among the receivers to estimate position and velocity of the target, this does not require the very tight synchronization required by other methods such as TOA and TDOA. Receiver share Doppler information, synchronized to within the target tracking requirements of the system, and not to within the timing requirements to estimate, for example, phase differences between receivers.

An additional advantage of this system is that it can take advantage of existing signals, without requiring additional signaling for purposes of tracking. For example, in a mobile robot setting, it is not required that specialized signals be provided for location-communication infrastructure within the region can put to dual use for location as well.

A further advantage of this system is that it may operate covertly. It may be desirable to locate and track a target without the target being aware that it is being tracked, for example in a surveillance application. The target may not be transmitting, and any signal directed toward the target (e.g., radar), may enable the target to learn that its motion is being tracked. By making use of incidental radio signals in the area, surveillance tracking is possible without an indication to the target that it is being tracked.

The embodiments may be used in a variety of settings. For example, it may be used within a building to track moving targets, such as mobile robots or persons within the building. It may also be used on the scale of a city or an airspace to track targets such as vehicles or aircraft. In another application, the target may be fixed, with the transmitters and receivers are moving relative to the target.

For convenience, positions and velocities are described using two-dimensional coordinates. However, the embodiments may be generalized to three-dimensional coordinates when a target is moving with three positional degrees of freedom.

In many applications, the transmitters will be fixed, such as when commercial radio transmitters or WiFi routers. But the embodiments also encompasses the situation where the transmitters are moving relative to the target.

Multiple transmitters can be advantageously accommodated when the signals that they transmit are, for example, bandpass signals occurring in different bands. The receivers can separately receive the signal from each transmitter in this case by performing complex basebanding using a carrier appropriate for the band in which the transmitter is transmitting.

The description of elements in each figure may refer to elements of proceeding figures. Like numbers refer to like elements in all figures, including alternate embodiments of like elements.

FIG. 1A is a schematic block diagram illustrating one embodiment of a target system 100. The system 100 includes a target 105, at least one transmitter 110, and at least one receiver 115. The target 105 may be in motion with a target velocity vector 103. The transmitter 110 may be in motion with transmitter velocity vector 109. The receiver 115 may be in motion with the receiver velocity vector 117.

The transmitter 110 may broadcast a transmitter signal 111. The transmitter signal 111 may be reflected by the target 105 as a target signal 107. The receiver 115 may receive the target signal 107. The receiver 115 may also receive the transmitter signal 111. The receiver 115 may receive the target signal 107 and the transmitter signal 111 as a combined signal 106.

In one embodiment, a field of interest 118 is defined for the target 105. The field of interest 118 may be within a specified radius of the target 105.

Figure 1B:
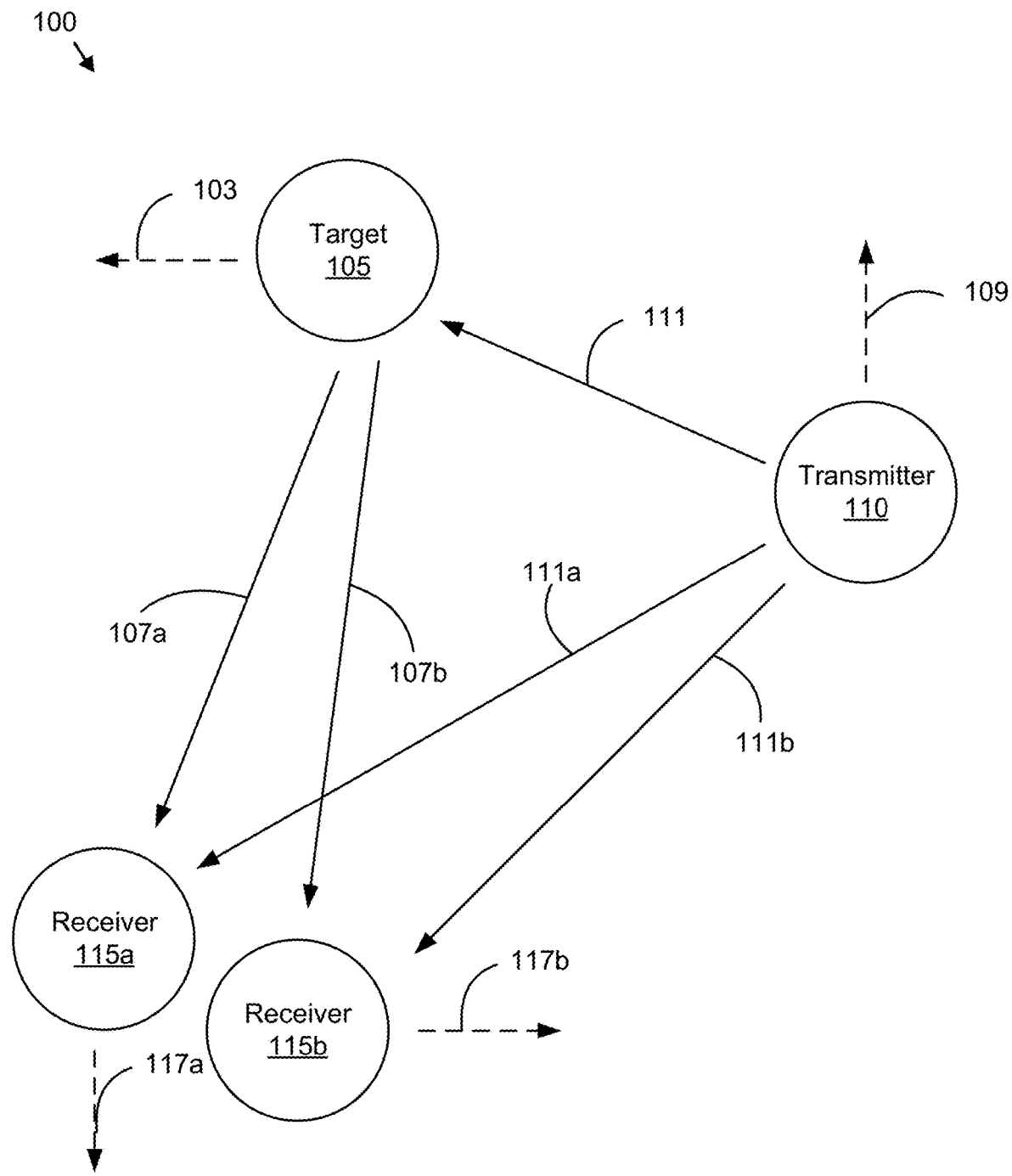
FIG. 1B is a schematic block diagram illustrating one alternate embodiment of a target system.

FIG. 1B is a schematic block diagram illustrating one alternate embodiment of the target system 100. In the depicted embodiment, two receivers 115 are shown. Each receiver 115a-b may have a unique receiver velocity vector 117a-b. Although two receivers 115a-b are shown, any number of receivers 115 may be employed.

Figure 1C:
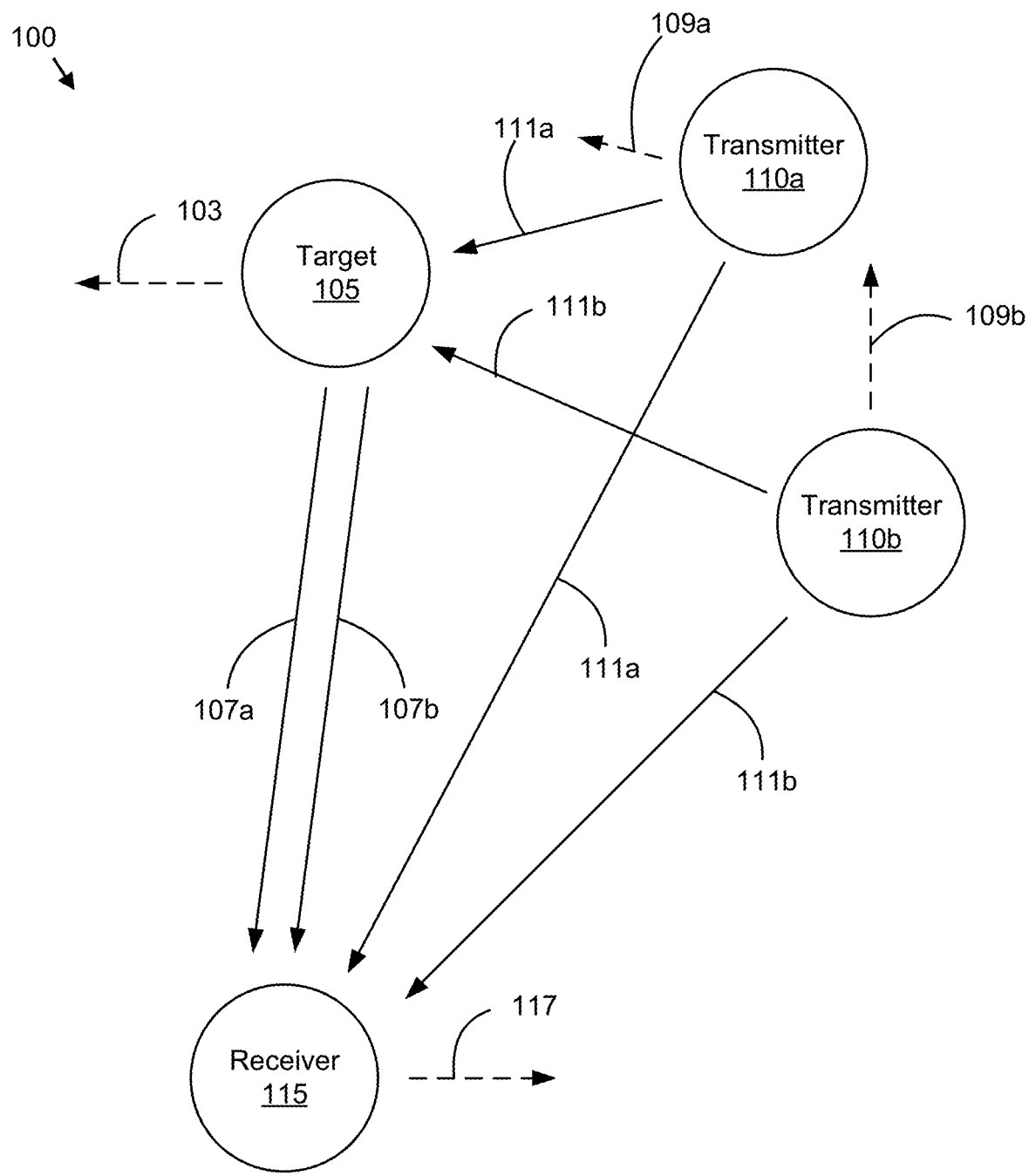
FIG. 1C is a schematic block diagram illustrating one alternate embodiment of a target system.

FIG. 1C is a schematic block diagram illustrating one alternate embodiment of 100 target system 100. In the depicted embodiment, two transmitters 110a-b are shown. Each transmitter 110a-b may have a unique transmitter velocity vector 109a-b. Although two transmitters 110a-b are shown, any number of transmitters 110 may be employed.

Figure 1D:
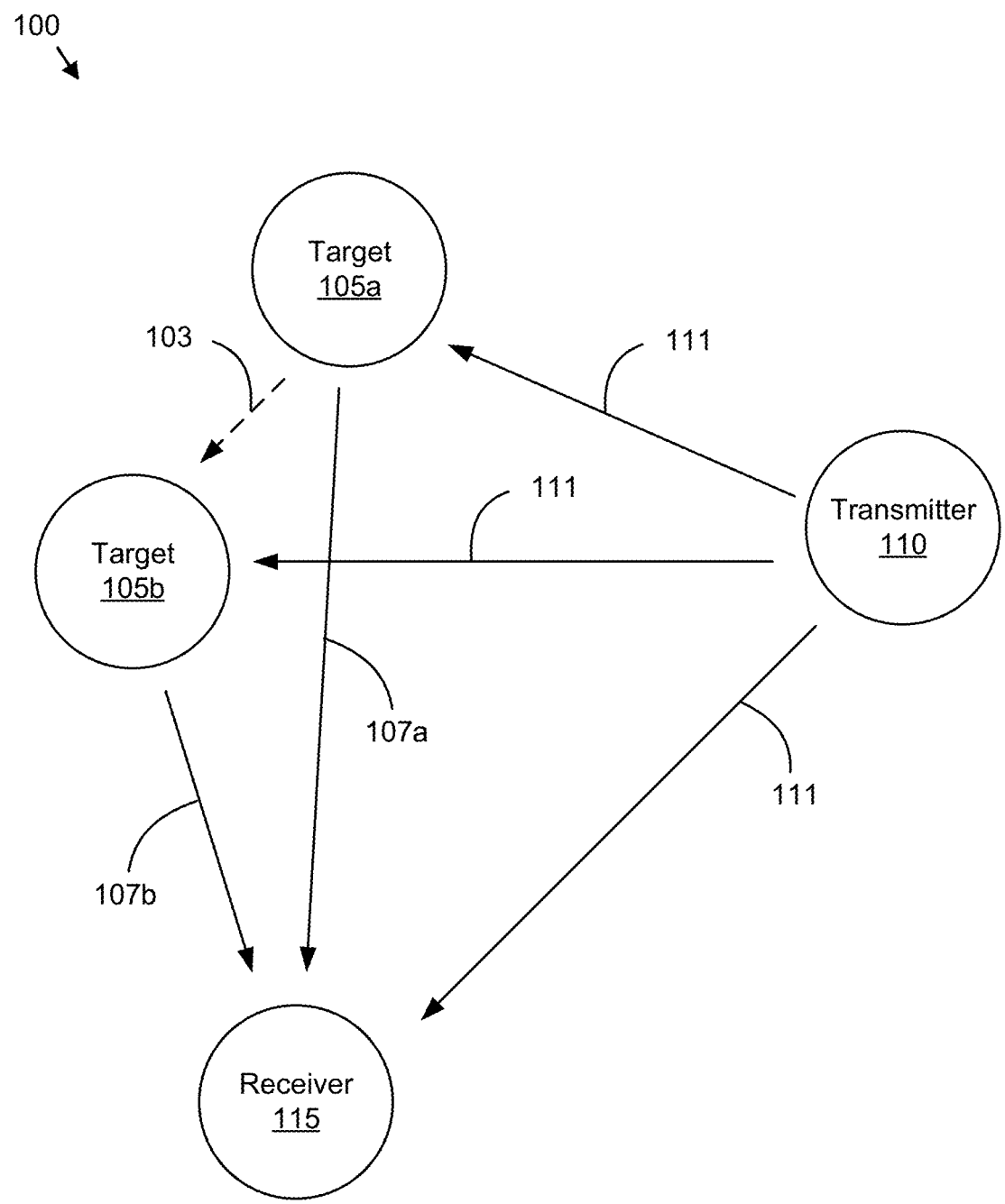
FIG. 1D is a schematic diagram illustrating one embodiment of a target system.

FIG. 1D is a schematic diagram illustrating one embodiment of a target system 100. In the depicted embodiment, two targets 105a-b are shown. Each target 105a-b has a corresponding target signal 107a-b that is received by the receiver 115. Although two targets 105 are shown, any number of targets 105 may be tracked.

Figure 1E:
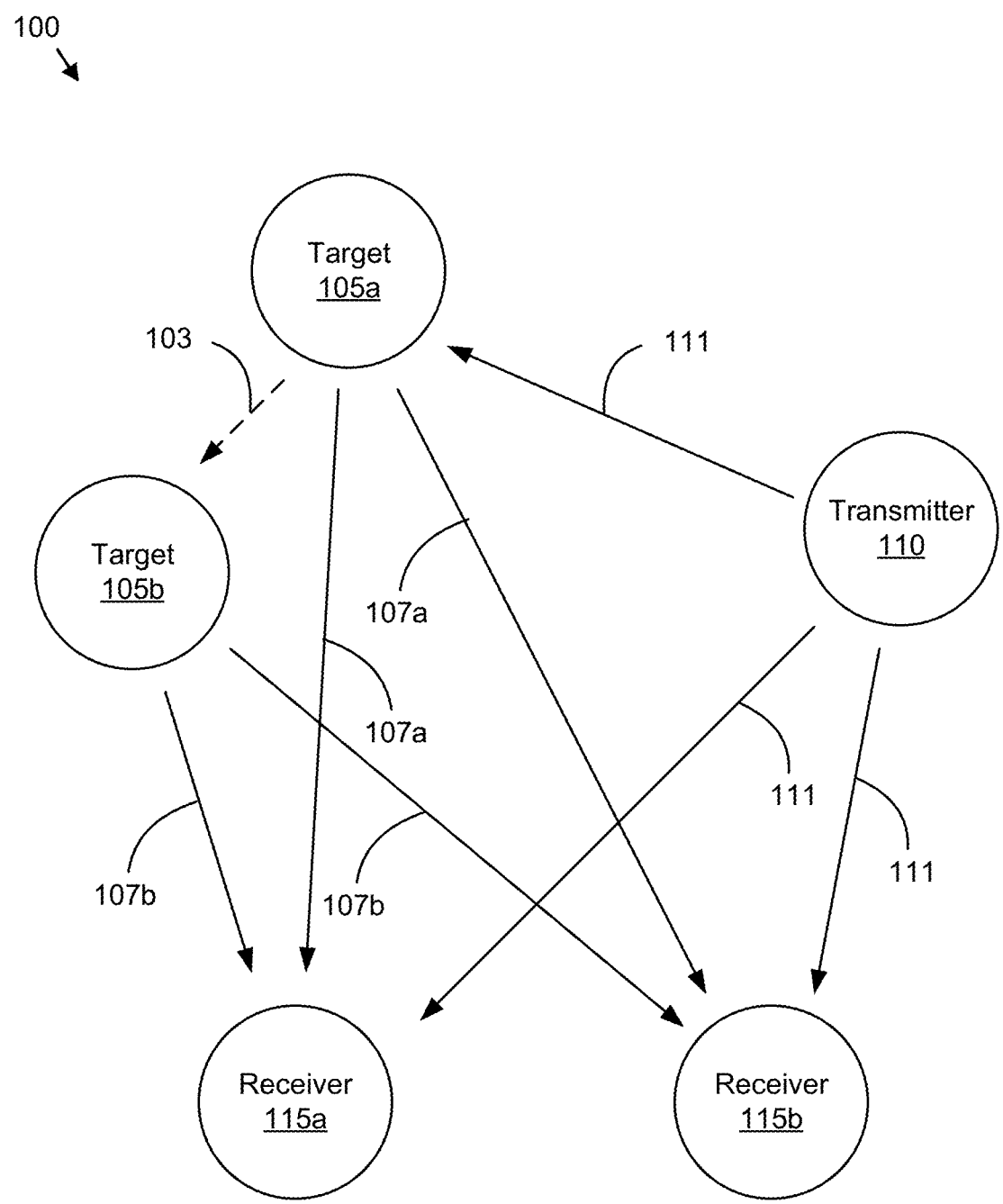
FIG. 1E is a schematic diagram illustrating one alternate embodiment of a target system.

FIG. 1E is a schematic diagram illustrating one alternate embodiment of a target system 100. In the depicted embodiment, two targets 105a-b and two receivers 115a-b are shown. Each receiver 115a-b receives a target signal 107a-b from each target 105a-b. Although one transmitter 110, two targets 105a-b, and two receivers 115a-b are shown, any number of transmitters 110, targets 105, and/or receivers 115 may be employed.

Figure 2A:
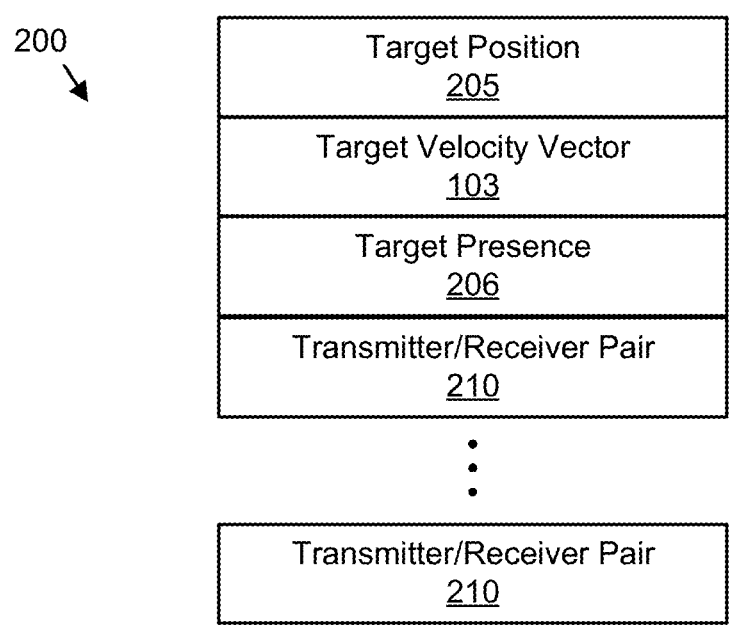
FIG. 2A is a schematic block diagram illustrating one embodiment of Doppler information.

FIG. 2A is a schematic block diagram illustrating one embodiment of Doppler information 200. The Doppler information 200 may be organized a data structure in a memory. In the depicted embodiment, the Doppler information 200 includes a target position 205, the target velocity vector 103, a target presence 206, and one or more transmitter/receiver pairs 210.

The target position 205 and/or target velocity vector 103 and/or target presence 206 may be calculated for each target 105 as will be described hereafter. Each transmitter/receiver pair 210 may record data for a transmitter 110 and a receiver 115. The transmitter/receiver pair 210 is described in more detail in FIG. 2B.

FIG. 2B is a schematic block diagram illustrating one embodiment of a transmitter/receiver pair 210. In the depicted embodiment, the transmitter/receiver pair 210 includes a Doppler frequency 201, a Doppler shift 203, the transmitter position 207, the transmitter velocity vector 109, transmitter signal characteristics 211, a receiver position 209, the receiver velocity vector 117, a carrier offset frequency 213, a spectral estimation algorithm 215, a sign estimation algorithm 217, a processed signal 219, channel state information (CSI) 221, an OFDM symbol index 227, a pilot subcarrier index 228, a signal Fourier transform 229, a CSI Fourier transform 231, and a CSI Doppler frequency 233.

The Doppler frequency 201 may be a frequency of a Doppler shift 203 of a target signal 107. The Doppler frequency 201 may be calculated as will be described hereafter. The Doppler shift 203 may be a change in frequency from a transmitter signal 111 to a target signal 107 and/or combined signal 106.

The transmitter position 207 identifies a spatial position of the transmitter 110 of the transmitter 110/receiver 105 pair. The transmitter velocity vector 109 is a vector describing the change of position of the transmitter 110. The transmitter signal characteristics 211 may describe a frequency of the transmitter signal 111, a strength of the transmitter signal 111, and the like.

The receiver position 209 identifies a spatial position of the receiver 104. The receiver velocity vector 117 describes the change of position of the receiver 105. The carrier offset frequency 213 may be calculated for each target signal 107.

The spectral estimation algorithm 215 may be selected from the group consisting of a MUltiple Signal Classification (MUSIC) algorithm, a Discrete Fourier Transform (DFT) algorithm, a Viterbi algorithm, a Bahl, Cocke, Jelinek and Raviv (BCJR) algorithm, and a BCJR algorithm in conjunction with the Viterbi algorithm.

The sign estimation algorithm 217 may estimate a sign of the Doppler frequency 201. The sign estimation algorithm 217 may be a maximum likelihood algorithm. The processed signal 219 may have a DC component, and a frequency component $f_d$ as will be described hereafter.

The CSI 221 may include information for a plurality of OFDM carrier signals. The OFDM carrier signals are described in FIG. 2C. The OFDM symbol index 227 indexes a plurality of OFDM carrier signals. The pilot subcarrier index 228 may comprise pilot indices pilot(n) for each OFDM subcarrier signal n. The signal Fourier transform 229 is a Fourier transform of the combined signal 106. The CSI Fourier transform 231 is a Fourier transform of the CSI 221. The CSI Doppler frequency 233 comprises Doppler frequencies estimated from the CSI Fourier transform 231.

Figure 2C:
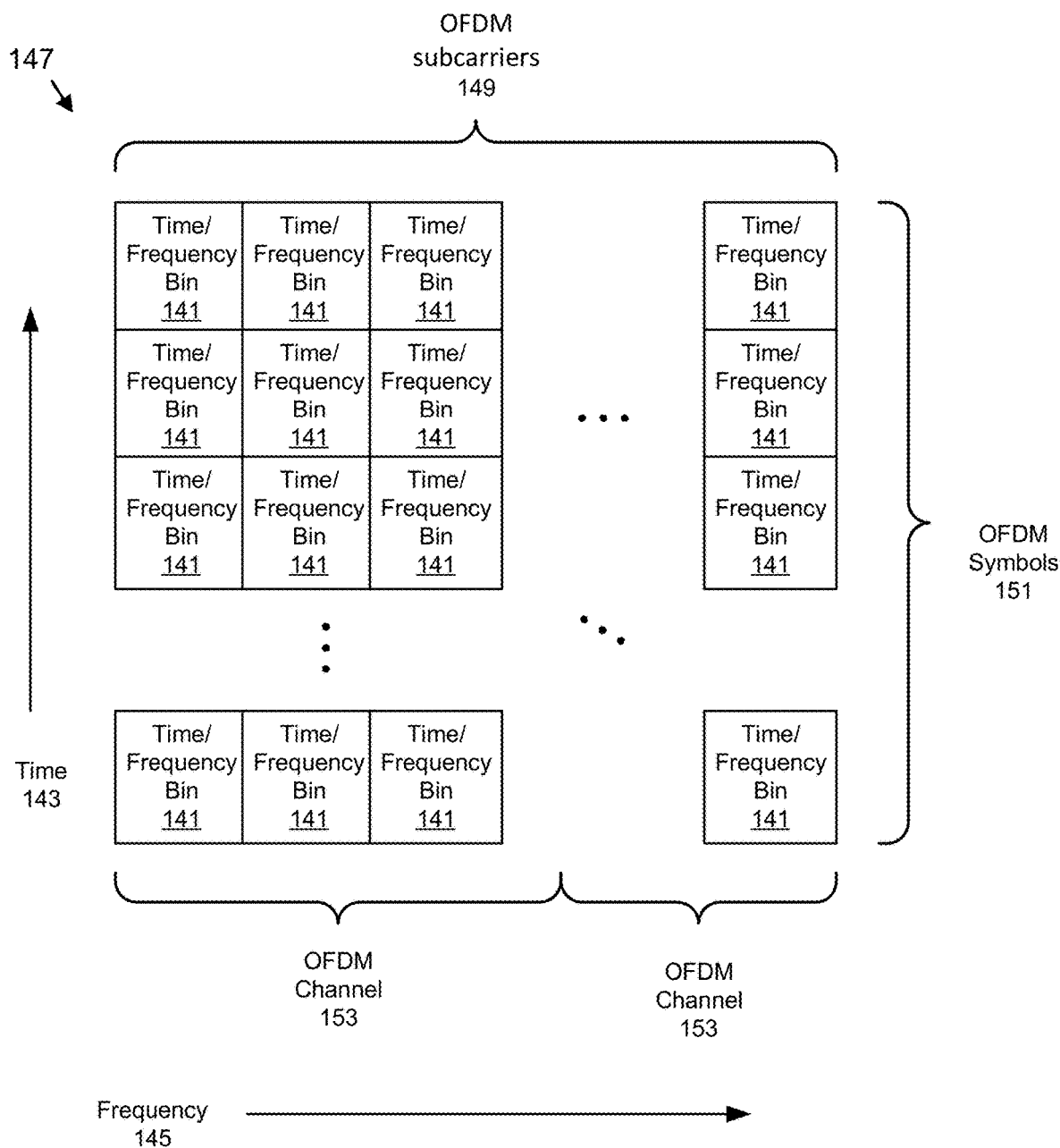
FIG. 2C is a schematic block diagram illustrating orthogonal frequency division multiplexing (OFDM) signals.

FIG. 2C is a schematic block diagram illustrating OFDM carrier signals 147. In the depicted embodiment, a plurality of OFDM subcarriers 149 comprise a plurality of OFDM channels 153 each with a different range of frequencies 145. The OFDM channels 153 comprises a plurality of time/frequency bins 141. Each time/frequency then 141 encodes specified information as OFDM symbols 151 and is separated from each other time/frequency pin 141 in both time 143 and frequency 145.

FIG. 2D is a schematic block diagram illustrating one embodiment of a data sequence 240. The data sequence 240 may be generated from a sequence of combined signals 106 over time. In the depicted embodiment, each entry 241 of the data sequence 240 includes CSI 221, a CSI Fourier transform 231, a CSI Doppler frequency 233, and the position 205 and/or velocity 103 for each target 105.

FIG. 2E is a schematic block diagram illustrating one embodiment of Fourier transform templates 129 and related data. The Fourier transform templates 129 may model a CSI Fourier transform 231. In the depicted embodiment, the Fourier transform templates 129 includes a central lobe template 125 and decide lobe template 127. In one embodiment, the CSI Doppler frequency 233 is estimated by matching the Fourier transform templates 129 to the CSI Fourier transform 231.

In one embodiment, a mean CSI Fourier transform 131 is estimated by averaging the CSI Fourier transform 231 of the CSI 221 over at least one OFDM subcarriers 149. In one embodiment, a Fourier transform model 133 is trained match Fourier Transforms as will be described hereafter.

Figure 3A:
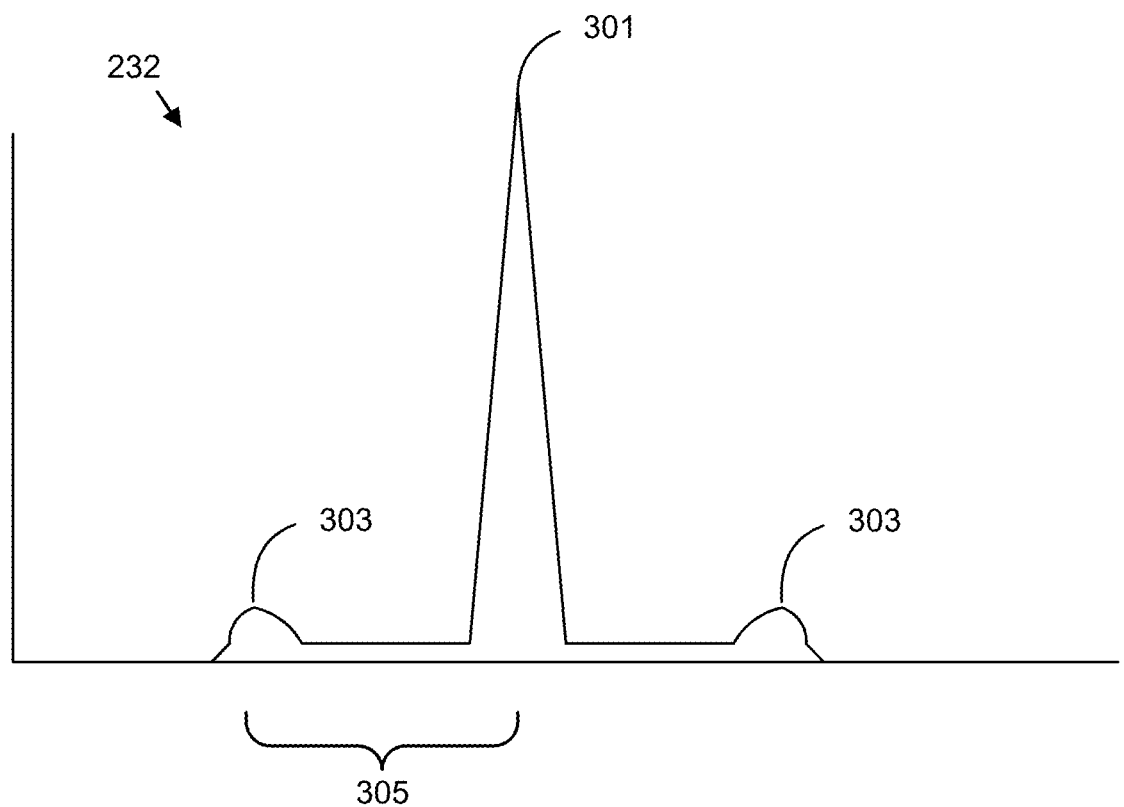
FIG. 3A is a diagram illustrating one embodiment of a Fourier transform.

FIG. 3A is a diagram illustrating one embodiment of a Fourier transform 232. The Fourier transform 232 may be the CSI Fourier transform 231. Alternatively, the Fourier transform 232 may be the signal Fourier transform 229. In the depicted embodiment, the Fourier transform 232 includes a central lobe 301 and at least one side lobe 303. A side lobe 303 may be separated from the center lobe 301 by a frequency interval 305. The frequency interval 305 may be measured, calculated, and/or estimated.

Figure 3B:
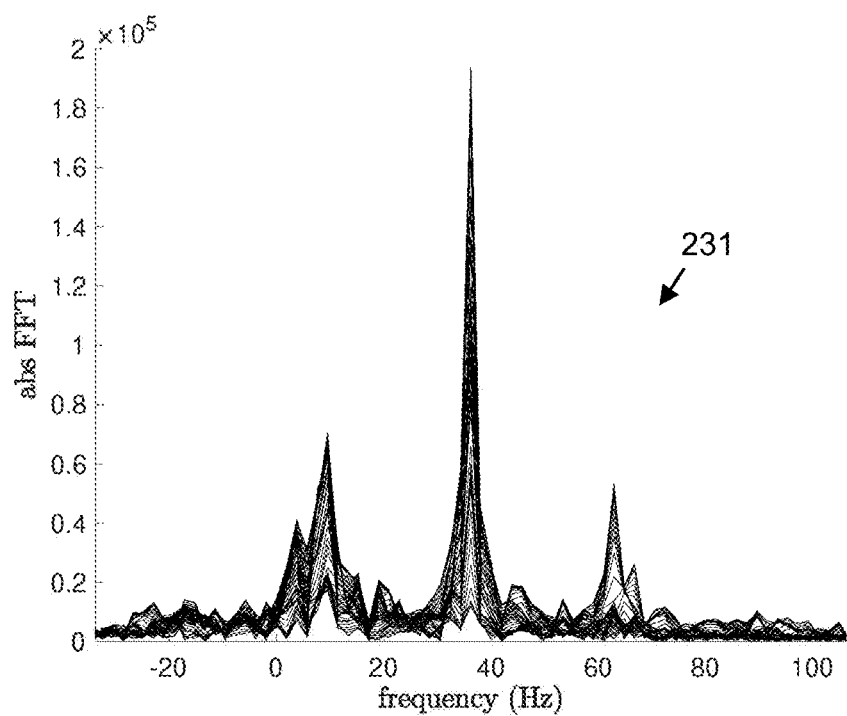
FIG. 3B is a graph illustrating one embodiment of CSI Fourier transforms.

FIG. 3B is a graph illustrating one embodiment of CSI Fourier transforms 231. A plurality of CSI Fourier transforms 231 for a plurality of CSI 221 are shown.

Figure 3C:
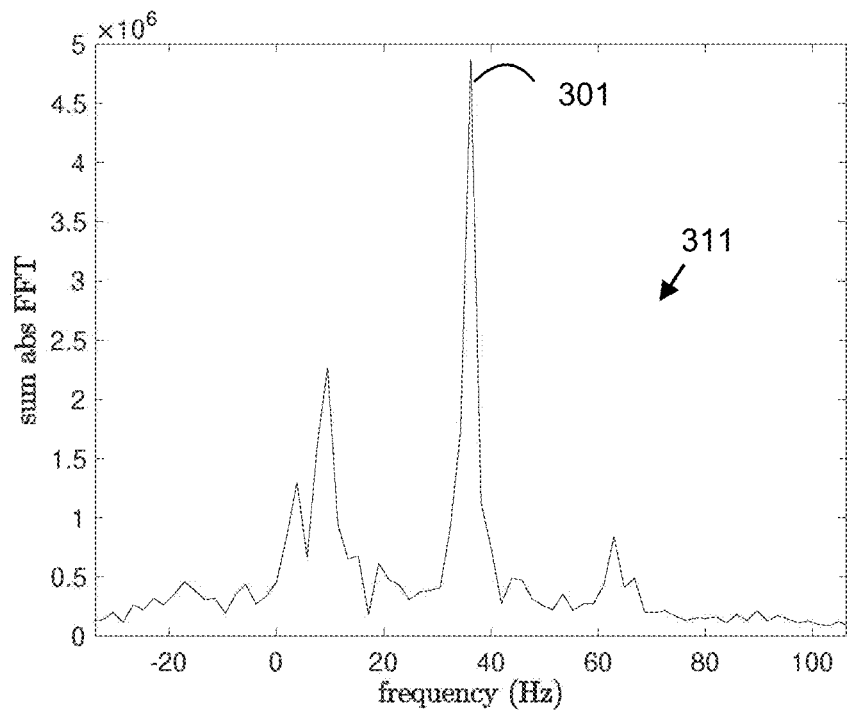
FIG. 3C is a graph illustrating one embodiment of a Fourier transform sum.

FIG. 3C is a graph illustrating one embodiment of a Fourier transform sum 311. A Fourier transform sum 311 of the Fourier transforms 231 of FIG. 3B is shown. The central lobe 301 of the Fourier transform sum 311 is shown.

Figure 3D:
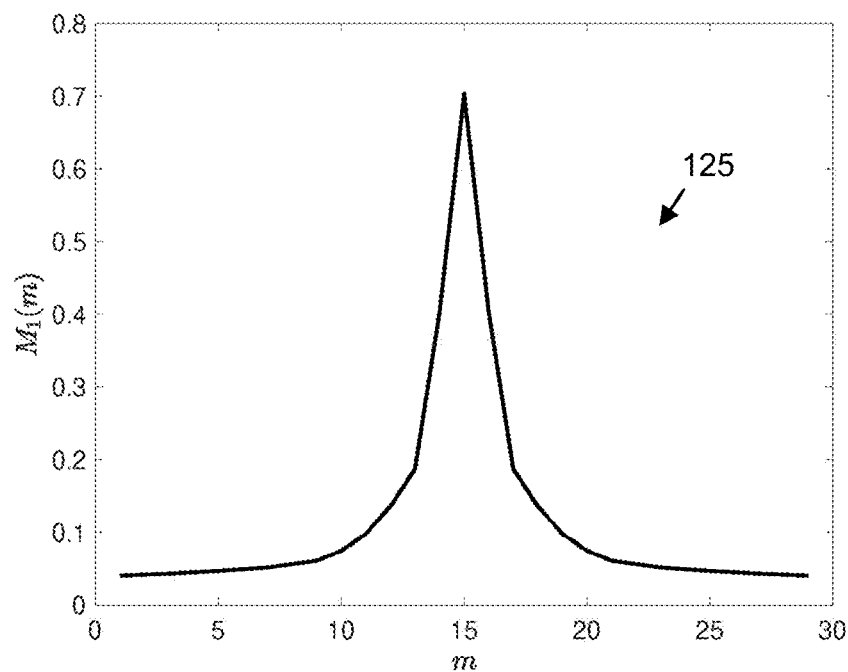
FIG. 3D is a graph illustrating one embodiment of a central lobe template.

FIG. 3D is a graph illustrating one embodiment of a central lobe template 125. The central lobe template 125 matches the central lobe 301 of the Fourier transform sum 311 of FIG. 3C.

Figure 3E:
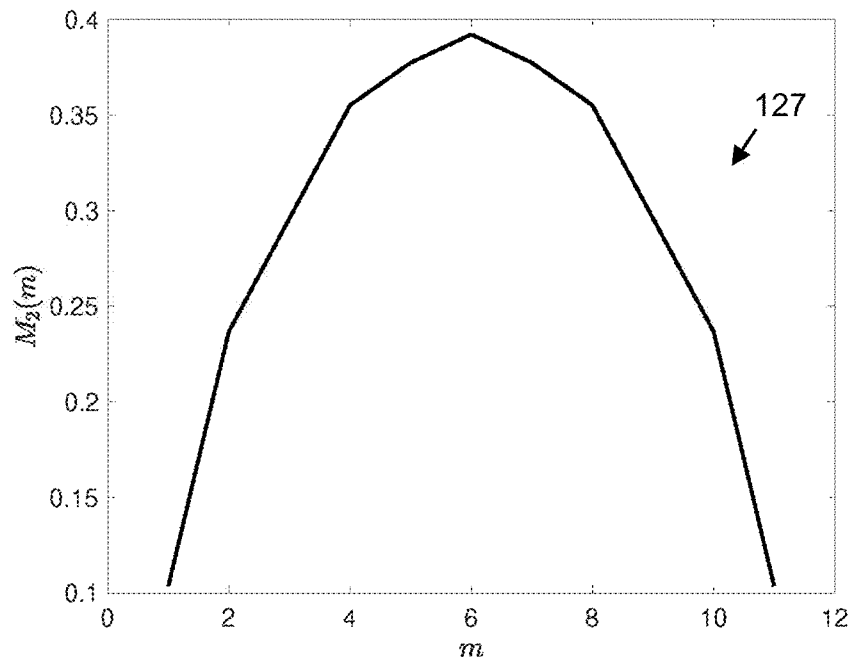
FIG. 3E is a graph illustrating one embodiment of a side lobe template.

FIG. 3E is a graph illustrating one embodiment of a side lobe template 127. The side lobe template 127 matches the side lobe 303 of the Fourier transform sum 311 of FIG. 3C.

Figure 3F:
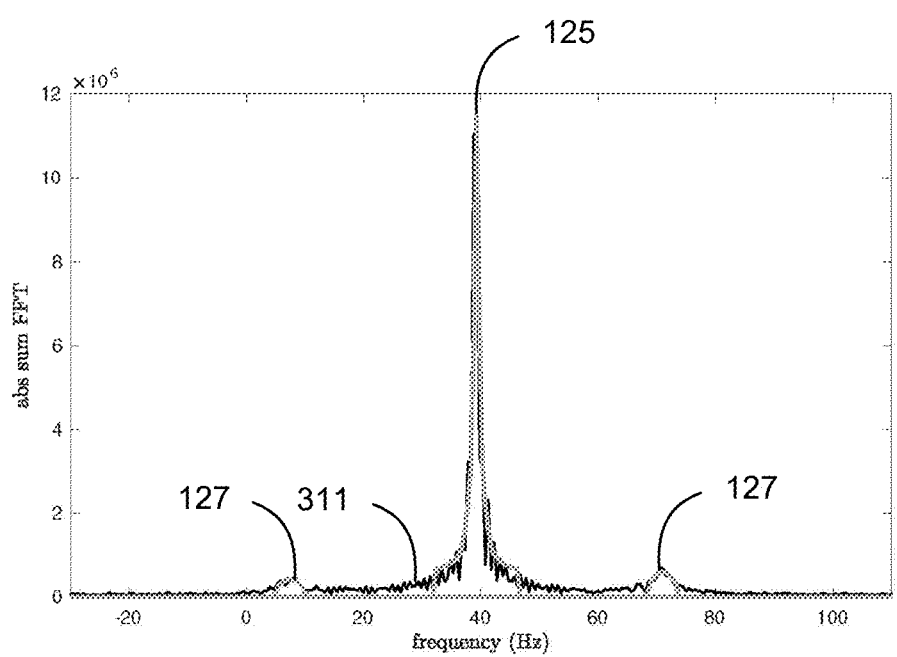
FIG. 3F is a graph illustrating one embodiment of template matching.

FIG. 3F is a graph illustrating one embodiment of template matching. In the depicted embodiment, the central lobe template 125 and/or side lobe templates 127 are matched to the Fourier transform sum 311. In the depicted embodiment, the match indicates that the target 105 is moving forward.

Figure 4:
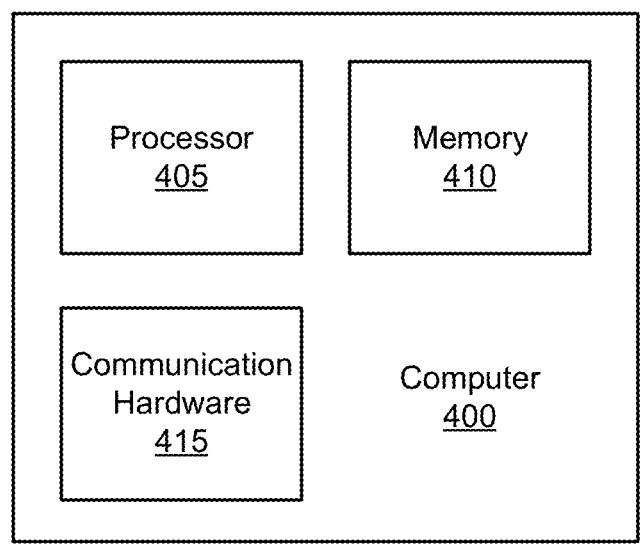
FIG. 4 is a schematic block diagram illustrating one embodiment of a computer.

FIG. 4 is a schematic block diagram illustrating one embodiment of a computer 400. In the depicted embodiment, the computer 400 includes a processor 405, a memory 410, and communication hardware 415. The memory 410 may include a semiconductor storage device, a hard disk drive, an optical storage device, or combinations thereof. The memory 410 may store code. The processor 405 may execute the code. The communication hardware 415 may communicate with other devices such as the receiver 115.

Figure 5A:
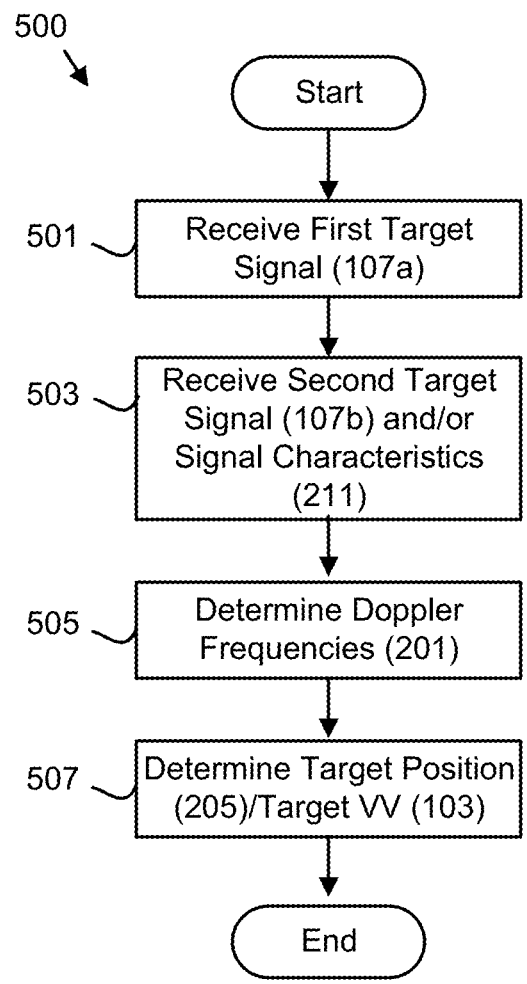
FIG. 5A is a schematic flow chart diagram illustrating one embodiment of a tracking method.

FIG. 5A is a schematic flow chart diagram illustrating one embodiment of a tracking method 500. The method 500 may be performed by the processor 405. The processor 405 may receive 501 a first target signal 107a reflected by a target 105 for a first transmitter/receiver pair 210a. The processor 405 may receive 503 a second target signal 107b reflected by the target 105 for a second transmitter/receiver pair 210b or transmitter signal characteristics 211 for a transmitter 110 of the first transmitter/receiver pair 210a.

The processor 405 may determine 505 Doppler frequencies 201 based on the first target signal 107a and the second target signal 107b or the transmitter signal characteristics 211. Embodiments of the determination 505 of the Doppler frequencies 201 is described in more detail in FIGS. 5B-C.

The processor 405 may determine 507 a target position 205 and a target velocity vector 103 for the target (105) based on the Doppler frequencies 201.

In one embodiment, $v_j(t)=(x_{T,j}(t), y_{T,j}(t), j=1,2, \ldots, J$, denotes the known position of a (possibly moving) transmitter 110, denoted as transmitter j 110, producing a signal $s_j(t)$.

The velocity of transmitter j 110 is shown in Equation 1.

$$V_{T,j}(t) = \left(\frac{d}{dt}x_{T,j}(t), \frac{d}{dt}y_{T,j}(t)\right) = (v_{T,j,x}(t), v_{T,j,y}(t)) \quad \text{Eq. 1}$$

In one embodiment, $t_k(t)=(x_{R,k}(t), y_{R,k}(t))$ denotes the known positions of (possibly moving) receivers k 115, for k=1, ..., K, with velocities as shown in Equation 2.

$$V_{T,k}(t) = \left(\frac{d}{dt}x_{R,k}(t), \frac{d}{dt}y_{R,k}(t)\right) = (v_{R,k,x}(t), v_{R,k,y}(t)) \quad \text{Eq. 2}$$

In one embodiment, g(t)=(x(t), y(t)) denotes the position of a single moving target 105, moving with a target velocity vector v(t) of Equation 3.

$$v(t) = \left(\frac{d}{dt}x(t), \frac{d}{dt}y(y)\right) = (v_x(t), v_y(t)) \qquad \text{Eq. 3}$$

The embodiments take measurements of target signals 107 (e.g., a radio or acoustic signal) at the receiver positions 209, and from that estimate the target position 205 and target velocity vector 103 of the target 105 as a function of time. Equation 4 may be a unit vector in the direction of the receiver velocity vector 117 from receiver positions $_k$(t) to (t) 209.

$$\hat{u}_{R,k}(t) = \frac{g(t) - q_k(t)}{\|g(t) - q_k(t)\|} \qquad \text{Eq. 4}$$

Equation 5 may denote a unit vector in the direction of the transmitter velocity vector 109 from transmitter positions $t_j$(t) to g(t) 207. $R_{T,j}$(t) may denote the range (distance) from transmitter j to target, and $R_{R,k}$(t) may denote the range from target 105 to receiver k 115.

$$\hat{u}_{T,j}(t) = \frac{(t) - j(t)}{\|(t) - j(t)\|} \qquad \text{Eq. 5}$$

The Doppler frequency at receiver k 115 due to the target signal 107 from transmitter j 110 produced by the relative motion of the transmitter, receiver, and target is given by Equation 6, where $f_0$ is the transmitted frequency (e.g., for a sufficiently narrowband signal with carrier $f_c$, $f_0$=$f_c$).

$$f_{d,j,k}(t) = -\frac{1}{\lambda}\left(\frac{dR_{T,j}(t)}{dt} + \frac{dR_{R,k}(t)}{dt}\right) = -\frac{f_0}{c}\left(\frac{dR_{T,j}(t)}{dt} + \frac{dR_{R,k}(t)}{dt}\right), \qquad \text{Eq. 6}$$

The sign in Equation 6 is such that if, for example, $R_{R,k}$(t) is decreasing (target 105 moving toward the receiver 115) the Doppler frequency is positive. The changes in path lengths are given by the projections of (t) onto the respective unit vectors of Equations 7.

$$\frac{dR_{T,j}(t)}{dt} = proj(v(t) - v_{T,j}(t), \hat{u}_{T,j}(t)) = (v(t) - v_{T,j}(t)) \cdot \hat{u}(t)$$

$$= (v_x(t) - v_{T,j,x}(t), v_y(t) - v_{T,j,y}(t)) \cdot \frac{(x(t), y(t)) - (x_{T,j}(t), y_{T,j}(t))}{\|(x(t), y(t)) - (x_{T,j}(t), y_{T,j}(t))\|}$$

$$\frac{dR_{R,k}(t)}{dt} = proj(v(t) - v_{R,k}(t), \hat{u}_{R,k}(t))$$

$$= (v_x(t) - v_{R,k,x}(t), v_y(t) - v_{R,k,y}(t)) \cdot \frac{(x(t), y(t)) - (x_{R,k}(t), y_{R,k}(t))}{\|(x(t), y(t)) - (x_{R,k}(t), y_{R,k}(t))\|}$$

Hence, Equation 8.

$$\text{Eq. 8}$$

$$f_{d,j,k}(x(t), y(t), v_x(t), v_y(t)) =$$

$$-\frac{f_0}{c}\left[(v_x(t), v_y(t)) \cdot \left(\frac{(x(t), y(t)) - (x_{T,j}(t), y_{T,j}(t))}{\|(x(t), y(t)) - (x_{T,j}(t), y_{T,j}(t))\|} + \frac{(x(t), y(t)) - (x_{R,k}(t), y_{R,k}(t))}{\|(x(t), y(t)) - (x_{R,k}(t), y_{R,k}(t))\|}\right) - \right.$$

$$(v_{T,j,x}(t), v_{T,j,y}(t)) \cdot \frac{(x(t), y(t)) - (x_{T,j}(t), y_{T,j}(t))}{\|(x(t), y(t)) - (x_{T,j}(t), y_{T,j}(t))\|} -$$

$$\left. (v_{R,k,x}(t), v_{R,k,y}(t)) \cdot \frac{(x(t), y(t)) - (x_{R,k}(t), y_{R,k}(t))}{\|(x(t), y(t)) - (x_{R,k}(t), y_{R,k}(t))\|}\right]$$

$$j = 1, 2, \ldots, J, i = 1, 2, \ldots, K.$$

The Doppler shift 203 is thus a function of both target position (x(t), y(t)) 205 and target velocity vector ($v_x$(t), $v_y$(t)) 103. To determine the target position 205 and the target velocity vector 103 from the target signals 107 received at the receivers 115, two fundamental signal processing operations may be employed. The first is the extraction of the Doppler frequencies at each receiver. The second is to take those Doppler frequencies and determine the position and velocity of the target, consistent with Equation 8.

A signal from transmitter j to receiver k is denoted as $s_{jk}$(t). However, in the discussion below, this will be denoted generically as s(t) and the Doppler shift due to the relative motions will be denoted as $f_d$(expressed in Hz). The signal s(t) is assumed to be represented as a complex signal. (A person of ordinary skill in the art will understand how to represent a real signal as a complex signal, such as by employing a Hilbert transform.) At a receiver there is a direct path signal and the signal reflected from the moving target. Taking the direct path signal as the reference for time and amplitude, the signal at a receiver can be written as Equation 9.

$$r(t) = s(t) + \alpha s(t - \tau_0) e^{j2\pi f_d t} + n(t) \qquad \text{Eq. 9}$$

Here, j is the complex unit=$\sqrt{-1}$, $\alpha$ is attenuation due to the additional path distance on the reflected path compared Eq. 7 to the direct path; $\tau_0$ is the additional delay between the direct path and the reflected path; $f_d$ is the Doppler due to relative motions among the transmitter, target, and receiver, as described by Equation 8; and n(t) is additive noise introduced, for example, at the receiver.

Extracting Doppler Information

From this received signal the Doppler frequency $f_d$ is to be extracted. One way to achieve this is to form the complex ambiguity function (CAF) by Equation 10.

$$A(\tau, F) = \int_{-\infty}^{\infty} r(t) r^*(t-\tau) e^{j2\pi Ft} dt \qquad \text{Eq. 10}$$

This ambiguity function may be searched to find a position ($\tau$, F) which maximizes $|A(\tau,F)|$. Since the primary variable of interest in this application is the Doppler frequency, in some applications it may suffice to determine T only approximately.

In one particular embodiment, the transmitted signal is a digital communication waveform, such as a quadrature amplitude modulated (QAM) signal or a signal produced by Wi-Fi other other communication device. This can be generalized to other digital communication waveforms. Accordingly, let Equation 11, $$s(t) = \sum_\ell a_\ell p(t - \ell T_s) \qquad \text{Eq. 11}$$

where $T_s$ denotes the symbol period $a_\ell$ represent a series of points drawn from a signal space; and p(t) is the baseband pulse-shaping waveform. The received signal at a receiver is Equation 12.

$$r(t) = \sum_\ell a_\ell p(t - \ell T_s) + \alpha \sum_\ell a_\ell p(t - \ell T_s - \tau_0) e^{j2\pi f_d t} + n(t) \qquad \text{Eq. 12}$$

In Equation 12, a carrier offset between the transmission signal 111 and the target signal 107 are known and/or removed by a phase lock loop and/or phase information shared between the transmitter 110 and the receiver 115.

In some operating scenarios the delay $\tau_0$ may be such that the delay time is inconsequential compared to the time scale of p(t) as shown in Equation 13, $$p(t) \approx p(t - \tau_0) \qquad \text{Eq. 13}$$

so that the received signal may be represented as Equation 14.

$$r(t) = \sum_\ell a_\ell p(t - \ell T_s) + \alpha \sum_\ell a_\ell p(t - \ell T_s) e^{j2\pi f_d t} + n(t) \qquad \text{Eq. 14}$$

In some operating scenarios, the attenuation factor $\alpha$ may be quite small, due, for example, to a small cross section of the target. When the received signal is passed through a filter matched to the pulse p(t), the matched filter output $z_\ell$ corresponding to symbol $\ell$ can be represented to sufficient fidelity as Equation 15, $$z_\ell = a_\ell + \alpha a_\ell e^{(j2\pi F_d \ell + \phi)} + v \qquad \text{Eq. 15}$$

where $F_d = f_d T_s$ represents the Doppler frequency signal sampled once per symbol time; $\phi$ is some phase, and v is the filtered noise. When $\alpha$ is small, the term $\alpha a_\ell e^{(2\pi F_d \ell + \phi)}$ may be regarded as small perturbation to the received signal. The matched filter output may be passed through a decision block to obtain an estimate $\hat{a}_\ell$ of the symbol. Then the matched filter output can be represented as Equation 16, $$z_\ell = \hat{a}_\ell + \hat{a}_\ell e^{\phi} e^{j2\pi F_d \ell} + v \qquad \text{Eq. 16}$$

yielding Equation 17, wherein a carrier offset between the transmitter signal 111 and the tareet sienal 107 is removed by the matched filter.

$$\frac{z_\ell - \hat{a}_\ell}{\hat{a}_\ell} \approx \alpha e^{\phi} e^{j2\pi F_d \ell} + v \qquad \text{Eq. 17}$$

The Doppler-shifted target signal 107 may be conceived as a phasor rotating around the signal point $a_\ell$ as shown in FIG. 1D. A sequence of the numbers $$\frac{z_\ell - \hat{a}_\ell}{\hat{a}_\ell}$$

can be Fourier transformed, for example using a fast Fourier transform, after which the Doppler frequency 201 can be determined by identify peaks in the transformed signal.

In one embodiment, the Doppler frequencies 201 are extracted at the receiver positions 209 of the receivers 115, so that the only information that needs to be shared among the receivers 115 is the Doppler information such as Doppler frequencies 201. It is thus not necessary to precisely synchronize the receivers 115 at the level that would be required, for example, to extract the phase difference between different receivers 115.

Knowing the Doppler frequencies 201 on the path from each transmitter 110 to each receiver 115, obtained using techniques such as those described above, the Equations 8 are used to determine x(t), y(t), $v_x(t)$ and $v_y(t)$. This may be done on a discrete-time basis, with updates produced every $T_p$ seconds, where $T_p$ is determined according to the dynamics of the system. For example, for tracking a walker target 105 within a room, selecting $T_p = 0.5$ seconds may suffice, producing a new update of target position 205 and target velocity vector 103 every 0.5 seconds. In an airplane target setting, it may suffice to set $T_p = 5$ seconds. Accordingly, Equation 8 may be evaluated at $t = nT_p$. Let x(n), y(n), $v_x(n)$, $v_y(n)$ be an abbreviated notation for $x(nT_p)$, $y(nT_p)$, $v_x(nT_p)$, $v_y(nT_p)$, and similarly for $x_T$, $y_T$, and so forth. Let $f_{d,j,k}(n)$ denote the Doppler information at time $nT_p$ from the signal from transmitter j 110 to receiver k 115. In one embodiment, the target position 205 and the target velocity vector 103 may be extracted by formulating a cost functional of Equation 18.

$$J(x(n), y(n), v_x(n), v_y(n)) = \sum_{j=1}^{J} \sum_{k=1}^{K} \bigg( f_{d,j,k}(n) + \qquad \text{Eq. 18}$$
$$\frac{f_0}{c}\bigg[(v_x(n), v_y(n)) \cdot \bigg(\frac{(x(t), y(t)) - (x_{T,j}(t), y_{T,j}(t))}{\|(x(t), y(t)) - (x_{T,j}(t), y_{T,j}(t))\|} + $$
$$\frac{(x(t), y(t)) - (x_{R,k}(t), y_{R,k}(t))}{\|(x(t), y(t)) - (x_{R,k}(t), y_{R,k}(t))\|}\bigg) - $$
$$(v_{T,j,x}(n), v_{T,j,y}(n)) \cdot \frac{(x(t), y(t)) - (x_{T,j}(t), y_{T,j}(t))}{\|(x(t), y(t)) - (x_{T,j}(t), y_{T,j}(t))\|} - $$
$$(v_{R,k,x}(n), v_{R,k,y}(n)) \cdot \frac{(x(t), y(t)) - (x_{R,k}(t), y_{R,k}(t))}{\|(x(t), y(t)) - (x_{R,k}(t), y_{R,k}(t))\|}\bigg]\bigg)^2$$

The embodiments may find parameters which minimize the cost function of Equation 19.

$$(\hat{x}(n), \hat{y}(n), \hat{v}_x(n), \hat{v}_y(n)) = $$
$$\text{argmin}_{x(n),y(n),vx(n),vy(n)v_x(n)v_y(n)} J(x(n), y(n), v_x(n), v_y(n)) \qquad \text{Eq. 19}$$

This minimization may be accomplished by any of several methods, such as gradient descent or Newton's method, starting from some initial condition.

In another embodiment, an extended Kalman filter or a second-order extended Kalman filter may be employed. To this end, a state vector is defined in Equation 20.

$$x(n) = \begin{bmatrix} x(n) \\ y(n) \\ v_x(n) \\ v_y(n) \end{bmatrix} \quad \text{Eq. 20}$$

A dynamics equation for this state. In one embodiment, this may be written as Equation 21, $$x(n+1)=ax(n)+w(n) \quad \text{Eq. 21}$$

where A describes the dynamics. In one embodiment the dynamics are expressed as Equation 22, $$A = \begin{bmatrix} 1 & 0 & T_p & 0 \\ 0 & 1 & 0 & T_p \\ 0 & 0 & 1 & 0 \\ 0 & 0 & 0 & 1 \end{bmatrix} \quad \text{Eq. 22}$$

Certain emodiments may incorporate additional information, such as representing inputs to the system. The observation equation is based on the relationship between the Doppler information and the position and velocity parameters. The observation vector is given by Equation 23.

$$y(n) = \begin{bmatrix} f_{d,1,1}(n) \\ f_{d,2,1} \\ \vdots \\ f_{d,J,1} \\ \vdots \\ f_{d,J,K}(n) \end{bmatrix} \quad \text{Eq. 23}$$

Figure 5B:
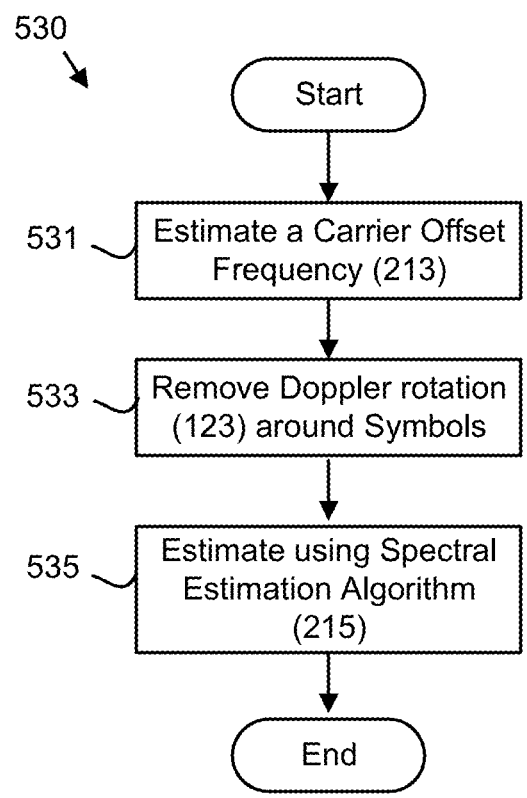
FIG. 5B is a schematic flow chart diagram illustrating one embodiment of a Doppler frequency estimation method.

FIG. 5B is a schematic flow chart diagram illustrating one embodiment of a Doppler frequency estimation method 530. The method 530 may estimate a Doppler frequency 201. In one embodiment, the method performs step 505 of FIG. 5A. The method 530 may be performed by a processor 405.

The method 530 starts, and in one embodiment, the processor 405 estimates 531 a carrier offset frequency 213 for each of the first target signal 107a and the second target signal (107b). The carrier offset frequency 213 may be estimated 561 between the transmission signal 111 and the target signal 107 received by the receiver 115. Since an amplitude of the transmission signal 111 β is much greater than the target signal 107 β̃, it is possible to estimate the carrier offset frequency $f_e$ 213 using a spectral estimation algorithm 215, including the DFT or the MUSIC algorithm.

The spectral estimation algorithm 215 may also include methods to produce a continuous carrierfrequency estimate. These methods may include using the Viterbi algorithm, the BCJR algorithm, or the BCJR algorithm in conjunction with the Viterbi algorithm. $\hat{f}_e$ may denote the estimated carrier offset frequency 213, with $\hat{f}_e \approx f_e$.

In one embodiment, a modified Viterbi algorithm spectral estimation algorithm 215 may be employed to estimate 531 the carrier offset frequency 213. The modified Viterbi algorithm may include a branch metric with a magnitude of a frequency bin of state k v(k) as shown in Equation 24 and a transition penalty μ(k, j) that may measure path deviation. In one embodiment, this may be as shown in Equation 25 where j and k are states.

$$v(k)=\text{abs}(X[k=f/N]) \quad \text{Eq. 24}$$

$$\mu(k, j)=K|k-j| \quad \text{Eq. 25}$$

The transition penalty may limit transitions to other frequencies. K is a control variable that lowers path values.

The processor 405 may remove 533 the carrier offset frequency 213 for each target signal 107 to yield the processed signal 219 comprising a Direct Current (DC) component and the Doppler frequency 201 for each target signal 107. In one embodiment, each target signal 107 is multiplied by $$e - j^2 \pi f^{ek}$$

to remove the carrier offset frequency 213, to form the processed signal $\tilde{z}_k$ 219 as shown in Equation 26. The target signal at a point in the receiver 115 may be written as $$z_l = \beta a_l + \tilde{\beta} a_l e^{j2\pi f^{el}}$$

where $f_e$ represents a carrier frequency offset 213 between a transmitter carrier and a receiver carrier.

$$\tilde{z}_k = z_k e^{-j^2 \pi f^{ek}} \approx \beta + \tilde{\beta} e^{j^2 \pi f^{dk}} + \text{noise}.$$

Eq. 26

The processor 405 may estimate 535 the Doppler frequency 201 for each target signal 107 and the method 530 ends. The processed signal 219 has a DC component, and a frequency component $f_d$. The frequency component $f_d$ may be estimated using the spectral estimation algorithm 215. The spectral estimation algorithm 215 may also include methods to produce a continuous carrierfrequency estimate 535 the Doppler frequency. These methods may include using the Viterbi algorithm, or the BCJR algorithm, or the BCJR algorithm in conjunction with the Viterbi algorithm.

In one embodiment, a matrix of probabilities is calculated using Equation 27. A transition value $\gamma_t(p, q)$ is calculated for describing the transitions between states p, q, where K1, K2, and δ are non-zero constants.

$$\gamma_t(p, q) = \begin{cases} e^{K_2 v(p)} e^{-K_1 |p-q|}, & \text{if } |p = q| < \delta \\ 0, & \text{otherwise} \end{cases} \quad \text{Eq. 27}$$

Figure 6:
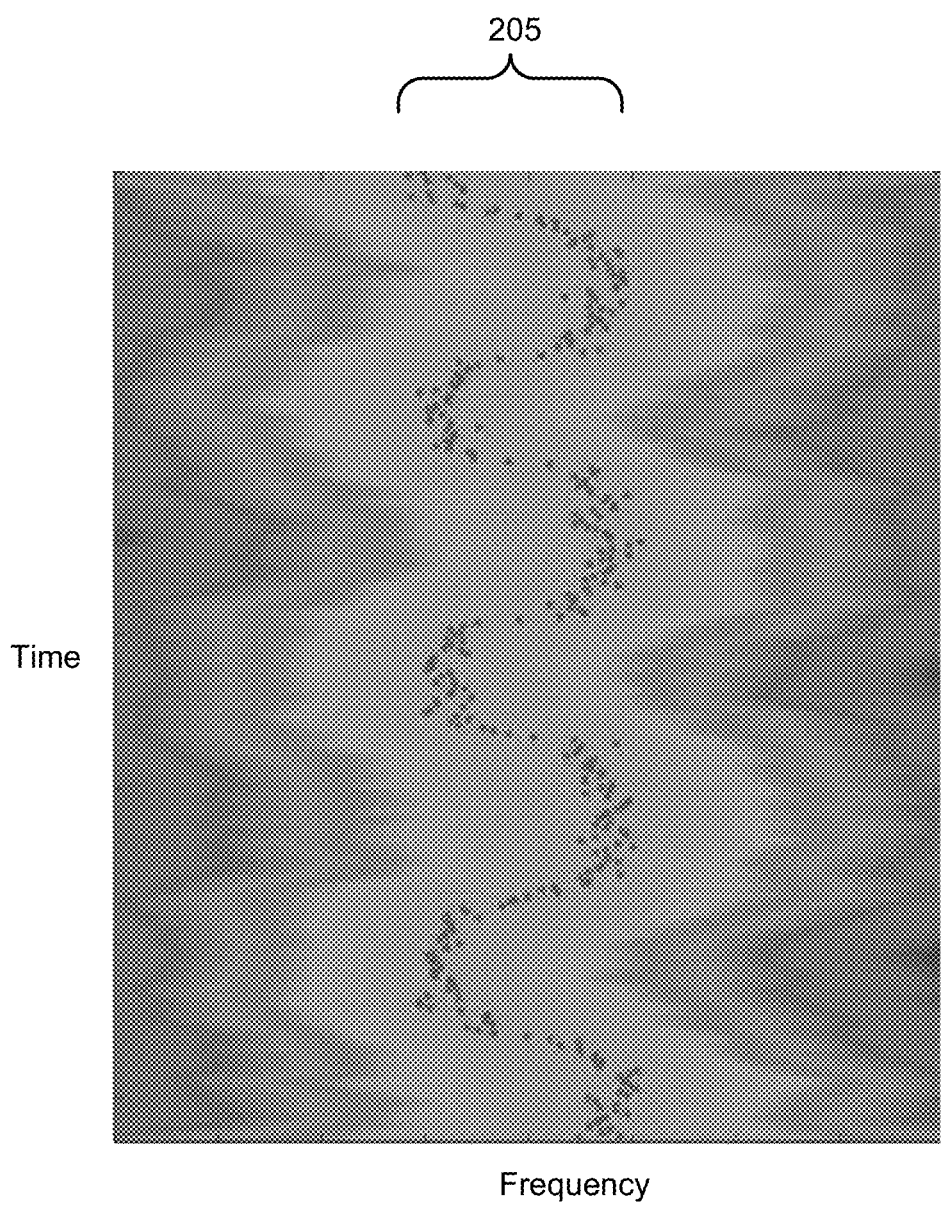
FIG. 6 is a drawing illustrating one embodiment of a target positions.

The Viterbi algorithm may be used to find a path through the matrix of probabilities that corresponds to the target position 205 as illustrated in FIG. 6.

Figure 5C:
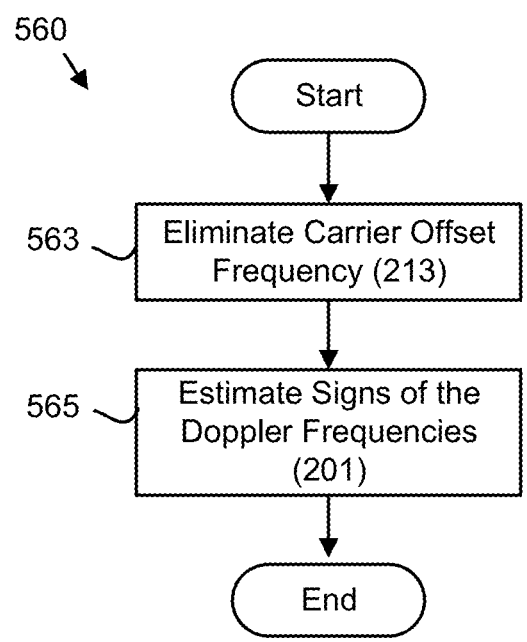
FIG. 5C is a schematic flow chart diagram illustrating one alternate embodiment of a Doppler frequency estimation method.

FIG. 5C is a schematic flow chart diagram illustrating one alternate embodiment of a Doppler frequency estimation method 560. The method 560 may estimate a Doppler frequency 201. In one embodiment, the method performs step 505 of FIG. 5A. The method 560 may be performed by a processor 405.

The method 560 starts, and the processor 405 may eliminate 563 the carrier offset frequency 213 by multiplying $z_k$ by its conjugate $z_k^*$, to form the function w k as shown in Equation 28.

$$w_k = z_k \tilde{z}_k = |\beta|^2 + |\tilde{\beta}|^2 + 2 \, \text{Re}(\beta \tilde{\beta}^*) \cos(2\pi f_d k) + \text{noise} \quad \text{Eq. 28}$$

The terms $|\beta|^2 + |\tilde{\beta}|^2$ constitute a DC component. The signal w k thus has spectral components at DC and at the Doppler frequency $f_d$ 201. However, since the Doppler frequency $f_d$ 201 now appears as the argument of a cosine function, the sign of Doppler frequency $f_d$ 201 is not apparent from $w_k$, so the absolute value $f_d$ is obtained by a spectral estimation algorithm 215.

The processor 405 may estimate 565 the signs of the Doppler frequencies $f_d$ 201. In one embodiment, the signs of the Doppler frequencies $f_d$ 201 are estimated using a maximum likelihood technique sign estimation algorithm 217.

In the maximum likelihood technique, a likelihood function f (z1, z2, . . . , $z_K$ s, $f_d$, $f_e$) is formulated. Here, $z_1$, $z_2$, . . . , $z_K$ represent symbol-timed samples over a time period of interest. The likelihood function may be formed under the assumption that the noise is Gaussian. To formulate this, approximate target signal values of β and $\beta^\sim$ may be employed. The unknown conditioning quantity may be removed as shown in Equation 29.

$$f(z_1, z_2, \ldots, z_K | s, |f_d|) = f(z_1, z_2, \ldots, z_K | s, |f_d| f_e) p(f_e) (df_e) \quad \text{Eq. 29}$$

In Equation 29, $p(f_e)$ is a density representing the range of possible carrier offset frequency values. In practice the density would be assumed to be uniform, and the integral would be evaluated by summing at sample points within the frequency range.

From this a likelihood ratio is computed using Equation 30.

$$\lambda = \frac{f(z1, z2, \ldots, Zk \mid s = 1, |fd|)}{f(z1, z2, \ldots, Zk \mid s = -1, |fd|)} \quad \text{Eq. 30}$$

The value of λ determines an estimate of the sign of the frequency. If λ>1, the sign of the frequency is determined to be 1. If λ<1, the sign of the frequency is determined to be −1.

Equivalently, a logarithm of the likelihood ratio may be computed, and the sign of $f_d$ determined from the sign of the log likelihood ratio.

Figure 5D:
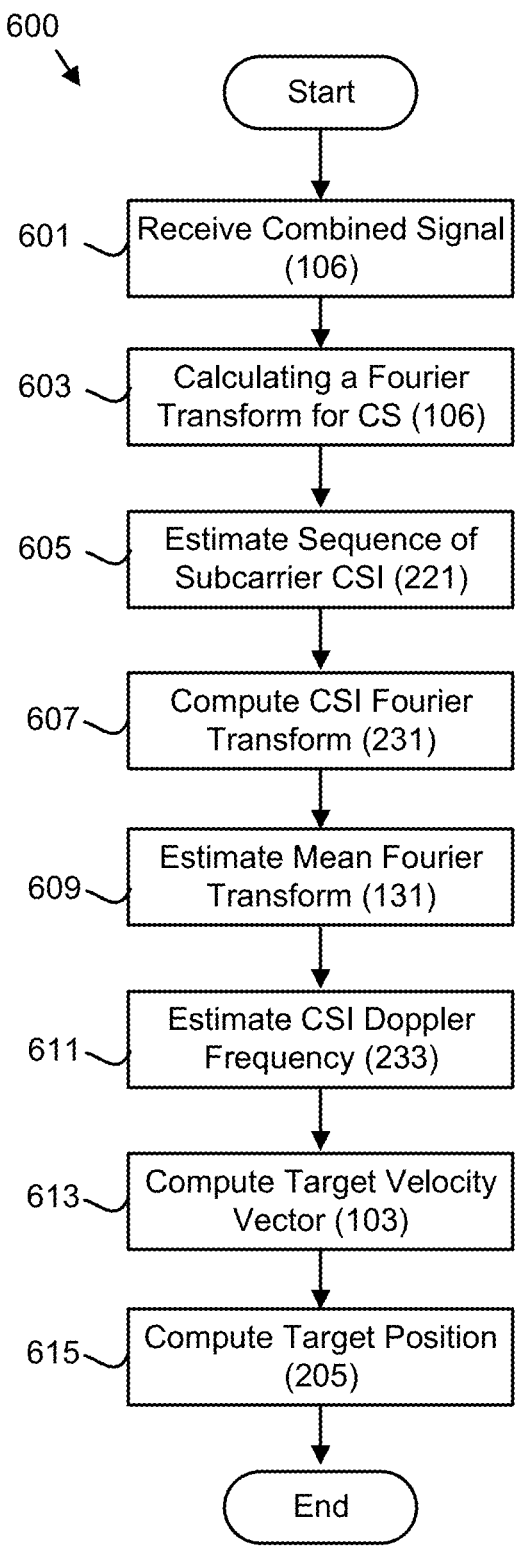
FIG. 5D is a schematic flow chart diagram illustrating one alternate embodiment of a tracking method.

FIG. 5D is a schematic flow chart diagram illustrating one alternate embodiment of a tracking method 600. The method 600 may be performed by the processor 405. The processor 405 may receive 501 the combined signal 106 comprising the target signals 107 and transmitter signals 111 and compute a target position 205 and the target velocity vector 103 for the target 105.

The method 600 starts, and in one embodiment, the processor 405 receives 601 the combined signal 106. The combined signal 106 includes the target signal 107 reflected by at least one target 105 and at least one transmitter signal 111 not reflected by the target 105. The at least one transmitter signal 111 may be comprised of a plurality of of OFDM subcarrier signals 147.

The processor 405 may calculate 603 the signal Fourier transform 229 for the combined signal 106. In one embodiment, pilot signals of the transmitter signal 111 are used to separate OFDM subcarriers 149 to obtain the complex symbols $z_m[r]$, where where n is the pilot subcarrier index 227, and m is the OFDM symbol index 227.

The processor 405 may estimate 605 a sequence of CSI $\hat{c}_{m,n}$ 221 for pilot indices of the pilot subcarrier index 227 for the OFDM subcarrier signals 147 of the combined signal 106 using Equation 31. Because the estimation 605 is peformed in real time, the step is not practically performed by the human mind. The sequence of $\hat{c}_{m,n}$ 221 may be recorded in the data sequence 240.

$$\hat{c}_{m,n} = \left( \frac{z_m[n]}{\text{pilot}_m[n]} \right) \quad \text{Eq. 31}$$

In one embodiment, the OFDM symbols 151 transmitted on OFDM subcarrier signals $\hat{a}_{m,n}$ 147 are estimated using Equation 32, wherein $$Q\left( \frac{z_m[n]}{\hat{c}_{m,n}} \right)$$

represents quantizing $$\left( \frac{z_m[n]}{\hat{c}_{m,n}} \right)$$

to a nearest point in the signal space and where $\hat{c}_{m,n}$ is the estimated CSI 221.

$$\hat{a}_{m,n} = Q\left( \frac{z_m[n]}{\hat{c}_{m,n}} \right) \quad \text{Eq. 32}$$

The processor 405 may further estimate 605 a sequence of CSI 221 over the non-pilot OFDM subcarriers 149 of the OFDM subcarrier signals 147 of the combined signal 106. In one embodiment, the CSI 221 for the non-pilot OFDM subcarriers 149 is interpolated from the CSI 221 for the pilot indices. As a result, the processor 405 may obtain CSI 221 for a sequence of M OFDM symbols 151.

The processor 405 may compute 607 the CSI Fourier transform 231 for the sequence of CSI 221 for the plurality of OFDM subcarriers 149. Because the computation 607 is peformed in real time, the step is not practically performed by the human mind. The CSI Fourier transforms 231 may be recorded in the data sequence 240 with the corresponding CSI 221.

The processor 405 may estimate 609 the mean Fourier transform 131. In one embodiment, the mean Fourier transform 131 is estimated by averaging the CSI Fourier transform 231 of the CSI 221 over at least one OFDM subcarrier 149. Because the estimation 609 is peformed in real time, the step is not practically performed by the human mind.

The processor 405 may estimate 611 the CSI Doppler frequency 233. In one embodiment, the CSI Doppler frequency 233 is estimated 611 by matching a Fourier transform template 129 to the CSI Fourier transform 231. The central lobe template 125 may be matched to a central lobe 301 of the CSI Fourier transform 231 indicating stationary components. In one embodiment the central lobe 301 is offset by a carrier offset frequency. In addition, the side lobe template 127 may be matched to side lobes 303 of the Fourier transform 232, indicative of Doppler frequency components. The match between the frequency interval 305 and the estimated frequency interval 305 may be identifyied using an extended Kalman filter. In a certain embodiment, the Fourier transform template 129 may match the CSI Fourier transform 231 if the frequency interval 305 of the Fourier transform template 129 is within a frequency threshold of the frequency interval 305 of the CSI Fourier transform 231. Because the estimation 611 is peformed in real time, the step is not practically performed by the human mind. The CSI Doppler frequency 233 may be recorded in the data sequence 240 with the corresponding CSI Fourier transform 231.

In one embodiment, the CSI Doppler frequency 233 is calculated using a complex ambiguity function. In addition, the CSI Doppler frequency 233 may be refined using a Viterbi algorithm.

In one embodiment, the CSI Doppler frequency 233 is estimated 611 using the Fourier transform model 133. The Fourier transform model 133 may be trained a data set comprising Fourier transform templates 129 and CSI Fourier transforms 231, with matches and no matches indicated in the data set.

In one embodiment, the CSI Doppler frequency r 233 is calculated from the delays $\tau_1$ and $\tau_1$ which minimize Equation 33.

$$r(\tau_1, \tau_2) = f^T f - R(\tau_1, \tau_2) = f^T P_M(\tau_1, \tau_2) f \qquad \text{Eq. 33}$$

Wherein f the spectrum of the CSI 221 is determined from Equation 34.

$$f = \begin{bmatrix} F(T_1) \\ F(T_1+1) \\ \vdots \\ F(T_2) \end{bmatrix} \qquad \text{Eq. 34}$$

$R(\tau_1, \tau_2)$ is the compressed likelihood expressed in Equation 35.

$$R(\tau_1, \tau_2) = ^T = I - M(\tau_1, \tau_2)^T [M(\tau_1, \tau_2)^T M(\tau_1, \tau_2)]^{-1}) \qquad \text{Eq. 35}$$

$P_M(\tau_1, \tau_2)$ is the matrix which projects onto the range of the matrix $M(\tau_1, \tau_2)$, where $M(\tau_1, \tau_2)$ is given by Equation 36.

$$M(\tau_1, \tau_2) = [m_1(\tau_1)\, m_2(\tau_1, \tau_2)\, m_1(\tau_1, \tau_2)] \qquad \text{Eq. 36}$$

And where $m_1(\tau_1)$, $m_2(\tau_1, \tau_2)$ represent the shifted templates described by Equations 37-39.

$$m_1(\tau_1) = \begin{bmatrix} M_1(T_1 - \tau_1) \\ M_1(T_1+1-\tau_1) \\ \vdots \\ M_1(T_2) \end{bmatrix} \qquad \text{Eq. 37}$$

$$m_2(\tau_1, \tau_2) = \begin{bmatrix} M_2(T_1 - (\tau_1+\tau_2)) \\ M_2(T_1+1-(\tau_1+\tau_2)) \\ \vdots \\ M_2(T_2-(\tau_1+\tau_2)) \end{bmatrix} \qquad \text{Eq. 38}$$

$$m_3(\tau_1, \tau_2) = \begin{bmatrix} M_2(T_1 - (\tau_1-\tau_2)) \\ M_2(T_1+1-(\tau_1-\tau_2)) \\ \vdots \\ M_2(T_2-(\tau_1-\tau_2)) \end{bmatrix} \qquad \text{Eq. 39}$$

The processor 405 may compute 613 the target position 205 for the target 105 from the CSI Doppler frequency 233. In one embodiment, the target position 205 is computed 613 within the field of interest 118. The processor 405 may further compute 615 the target position 205 for the target 105 and the method 600 ends. The dynamics for the target 105 may be computed based on a Singer model. Because the computations 613/615 are peformed in real time, the steps are not practically performed by the human mind. The target position 205 may be computed 615 within the field of interest 118.

In one embodiment, target position 205 and/or the target velocity vector 103 are determined based on Equation 40, wherein $f_{d,i,j}$ denotes Doppler frequency determined at receiver j from a signal transmitted at transmitter i, and wherein x(t) and y(t) are a position of the target 105 at time t, $x_{R,j}(t)$ and $y_{R,j}(t)$ are a position of a receiver j 115 at time t, $x_{T,i}(t)$ and $y_{T,i}(t)$ are a position of a transmitter i (110) at time t, $v_x(t)$ and $v_y(t)$ are a velocity of the target 105 at the time t, $f_c$ is a carrier frequency of the combined signal 106.

Eq. 40

$$f_{d,i,j}(x(t), y(t), v_x(t), v_y(t)) =$$

$$-\frac{f_c}{c} \left[ (v_x(t), v_y(t)) \cdot \left( \frac{(x(t), y(t)) - (x_{T,i}(t), y_{T,i}(t))}{\|(x(t), y(t)) - (x_{T,i}(t), y_{T,i}(t))\|} + \frac{(x(t), y(t)) - (x_{R,j}(t), y_{R,j}(t))}{\|(x(t), y(t)) - (x_{R,j}(t), y_{R,j}(t))\|} \right) - \right.$$

$$(v_{T,i,x}(t), v_{T,i,y}(t)) \cdot \frac{(x(t), y(t)) - (x_{T,i}(t), y_{T,i}(t))}{\|(x(t), y(t)) - (x_{T,i}(t), y_{T,i}(t))\|} -$$

$$\left. (v_{R,j,x}(t), v_{R,j,y}(t)) \cdot \frac{(x(t), y(t)) - (x_{R,j}(t), y_{R,j}(t))}{\|(x(t), y(t)) - (x_{R,j}(t), y_{R,j}(t))\|} \right]$$

$$i = 1, 2, \ldots, I, \; j = 1, 2, \ldots, J.$$

The embodiments use the mathematical formulas and calculations in a specific manner that limits the use of the mathematical concepts to the practical application of computing the target position 205 and computing the target velocity vector 103. Thus, the the mathematical concepts are integrated into a process that provides position and motion information for the target 105.

FIG. 6 is a drawing illustrating one embodiment of target positions 205 plotted against time and frequency. Light shading corresponds to high transition values $y_t(p, q)$ and dark shading corresponds to low transition values.

Figure 7:
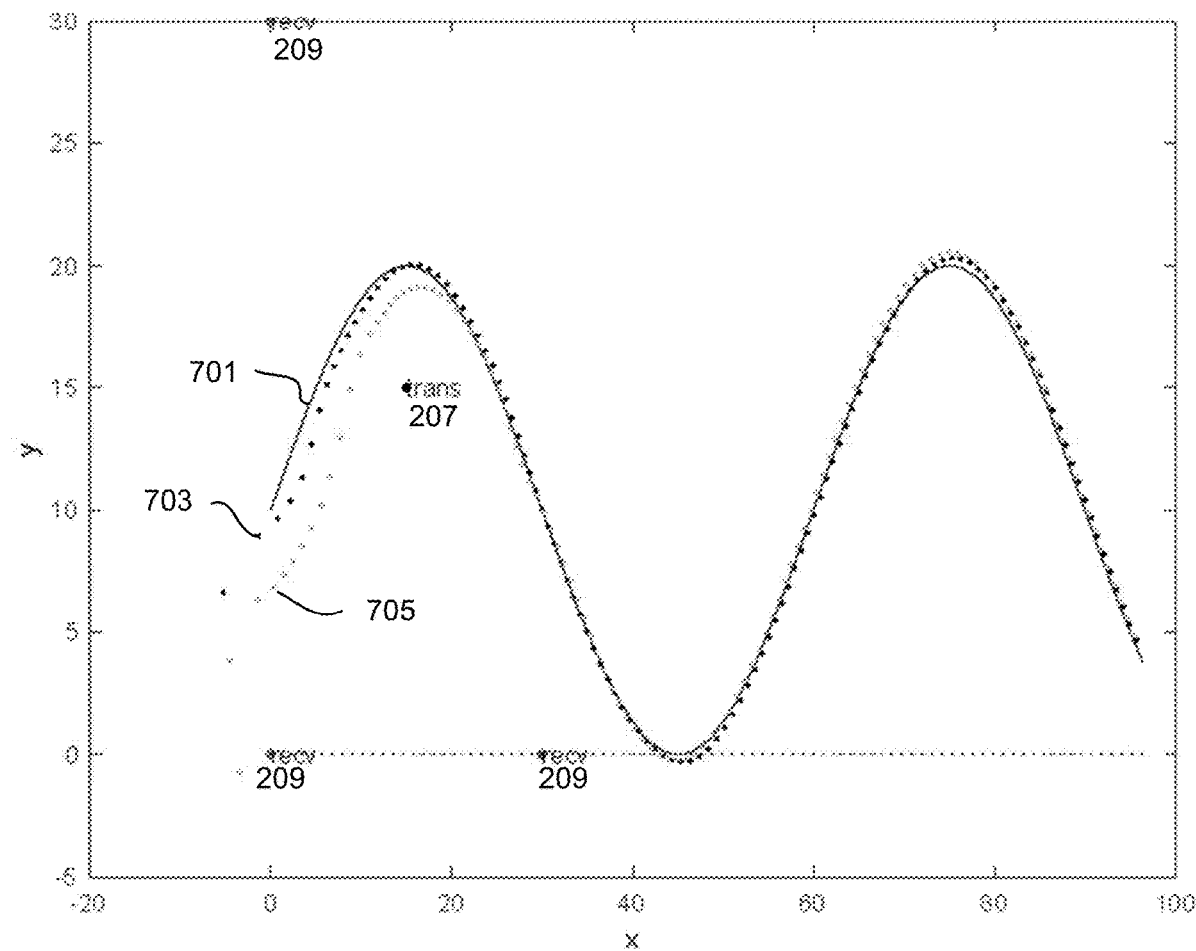
FIG. 7 is a graph illustrating one embodiment of tracking.

FIG. 7 is a graph illustrating one embodiment of tracking. A simulated track 701 portraying a person walking is shown in x and y spatial coordinates. Receiver positions 209 of receivers 115 and a transmitter position 207 of a transmitter 110 are also shown. The dots indicate the estimate target positions 205 computed using the extended Kalman filter 703 and second order extended Kalman filter 705.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
receiving a combined signal comprising a target signal reflected by a target and a transmitter signal not reflected by the target, wherein the transmitter signal is comprised of a plurality of orthogonal frequency division multiplexing (OFDM) subcarrier signals;

calculating a signal Fourier transform for the combined signal to obtain the complex symbols $z_m[n]$, where where n is the pilot subcarrier index, m is an OFDM symbol index;

estimating a sequence of channel state information (CSI) $c_{m,n}$ for pilot indices of the pilot subcarrier index for the OFDM subcarrier signals of the combined signal as $\hat{c}_{m,n}=(z_m[n]/\text{pilot}_m(n))$ estimating CSI over for non-pilot OFDM subcarriers of the combined signal to obtain CSI for a sequence of M OFDM symbols;

computing a CSI Fourier transform for the sequence of CSI for a plurality of OFDM subcarriers;

estimating a mean Fourier transform by averaging the CSI Fourier transform of the CSI over at least one OFDM subcarriers;

estimating a CSI Doppler frequency by matching a central lobe template of a Fourier transform to the CSI Fourier transform indicating stationary components, and wherein a side lobe template is matched to side lobes of the Fourier transform indicative of Doppler frequency components; and computing each of a target position and a target velocity vector for the target within a field of interest from the CSI Doppler frequency.

2. The method of claim 1, wherein the target position and/or the target velocity vector are determined based on the equation:

$$f_{d,i,j}(x(t), y(t), v_x(t), v_y(t)) =$$

$$-\frac{f_c}{c}\left[(v_x(t), v_y(t)) \cdot \left(\begin{array}{c} \frac{(x(t), y(t)) - (x_{T,i}(t), y_{T,i}(t))}{\|(x(t), y(t)) - (x_{T,i}(t), y_{T,i}(t))\|} + \\ \frac{(x(t), y(t)) - (x_{R,j}(t), y_{R,j}(t))}{\|(x(t), y(t)) - (x_{R,j}(t), y_{R,j}(t))\|} \end{array}\right) - \right.$$

$$(v_{T,i,x}(t), v_{T,i,y}(t)) \cdot \frac{(x(t), y(t)) - (x_{T,i}(t), y_{T,i}(t))}{\|(x(t), y(t)) - (x_{T,i}(t), y_{T,i}(t))\|} -$$

$$\left. (v_{R,j,x}(t), v_{R,j,y}(t)) \cdot \frac{(x(t), y(t)) - (x_{R,j}(t), y_{R,j}(t))}{\|(x(t), y(t)) - (x_{R,j}(t), y_{R,j}(t))\|} \right]$$

$$i = 1, 2, \ldots, I, j = 1, 2, \ldots, J.$$

wherein $f_{d,i,j}$ denotes Doppler frequency determined at receiver j from a signal transmitted at transmitter i, and wherein x (t) and y (t) are a position of the target at time t, $x_{Rj}(t)$ and $y_{Rj}(t)$ are a position of a receiver j at time t, $x_{T,i}(t)$ and $y_{T,i}(t)$ are a position of a transmitter i at time t, $v_x(t)$ and $v_y(t)$ are a velocity of the target (105) at the time t, fc is a carrier frequency of the combined signal (106).

3. The method of claim 1, wherein the central lobe is offset by a carrier offset frequency.

4. The method of claim 1, wherein the match between the frequency interval and the estimated frequency interval is identifyied using an extended Kalman filter.

5. The method of claim 1, wherein the CSI Doppler frequency is refined using a Viterbi algorithm.

6. The method of claim 1, wherein the CSI Doppler frequency is calculated using a complex ambiguity function.

7. The method of claim 1, wherein the OFDM symbols transmitted on OFDM subcarrier signals are estimated as $$\hat{a}_{m,n} = Q\left(\frac{z_m[n]}{\hat{c}_{m,n}}\right),$$

wherein $$Q\left(\frac{z_m[n]}{\hat{c}_{m,n}}\right)$$

represents quantizing $$\left(\frac{z_m[n]}{\hat{c}_{m,n}}\right)$$

to a nearest point in the signal space and where $\hat{c}_{m,n}$ is the estimated CSI.

8. An apparatus comprising:

a processor executing code stored on a memory to perform:

receiving a combined signal comprising a target signal reflected by a target and a transmitter signal not reflected by the target, wherein the transmitter signal is comprised of a plurality of orthogonal frequency division multiplexing (OFDM) subcarrier signals;

calculating a signal Fourier transform for the combined signal to obtain the complex symbols $Z_m[n]$, where where n is the pilot subcarrier index, m is an OFDM symbol index;

estimating a sequence of channel state information (CSI) $c_{m,n}$ for pilot indices of the pilot subcarrier index for the OFDM subcarrier signals of the combined signal as $$\hat{c}_{m,n} = \left(\frac{z_m[n]}{\text{pilot}_m(n)}\right);$$

estimating CSI over for non-pilot OFDM subcarriers of the combined signal to obtain CSI for a sequence of M OFDM symbols;

computing a CSI Fourier transform for the sequence of CSI for a plurality of OFDM subcarriers;

estimating a mean Fourier transform by averaging the CSI Fourier transform of the CSI over at least one OFDM subcarriers;

estimating a CSI Doppler frequency by matching a central lobe template of a Fourier transform to the CSI Fourier transform indicating stationary components, and wherein a side lobe template is matched to side lobes of the Fourier transform indicative of Doppler frequency components; and computing each of a target position and a target velocity vector for the target within a field of interest from the CSI Doppler frequency.

9. The apparatus of claim 8, wherein the target position and/or the target velocity vector are determined based on the equation:

$$f_{d,i,j}(x(t), y(t), v_x(t), v_y(t)) =$$

$$-\frac{f_c}{c}\left[(v_x(t), v_y(t))\cdot \begin{pmatrix} \frac{(x(t), y(t)) - (x_{T,i}(t), y_{T,i}(t))}{\|(x(t), y(t)) - (x_{T,i}(t), y_{T,i}(t))\|} + \\ \frac{(x(t), y(t)) - (x_{R,j}(t), y_{R,j}(t))}{\|(x(t), y(t)) - (x_{R,j}(t), y_{R,j}(t))\|} \end{pmatrix} - \right.$$

$$(v_{T,i,x}(t), v_{T,i,y}(t))\cdot \frac{(x(t), y(t)) - (x_{T,i}(t), y_{T,i}(t))}{\|(x(t), y(t)) - (x_{T,i}(t), y_{T,i}(t))\|} -$$

$$\left. (v_{R,j,x}(t), v_{R,j,y}(t))\cdot \frac{(x(t), y(t)) - (x_{R,j}(t), y_{R,j}(t))}{\|(x(t), y(t)) - (x_{R,j}(t), y_{R,j}(t))\|}\right]$$

$$i = 1, 2, \ldots, I, j = 1, 2, \ldots, J.$$

wherein $f_{d,i,j}$ denotes Doppler frequency determined at receiver j from a signal transmitted at transmitter i, and wherein x (t) and y (t) are a position of the target at time t, $x_{Rj}(t)$ and $y_{Rj}(t)$ are a position of a receiver j at time t, $x_{T,i}(t)$ and $y_{T,i}(t)$ are a position of a transmitter i at time t, $v_x(t)$ and $v_y(t)$ are a velocity of the target (105) at the time t, fc is a carrier frequency of the combined signal.

10. The apparatus of claim 8, wherein the central lobe is offset by a carrier offset frequency.

11. The apparatus of claim 8, wherein the match between the frequency interval and the estimated frequency interval is identifyied using an extended Kalman filter.

12. The apparatus of claim 8, wherein the CSI Doppler frequency is refined using a Viterbi algorithm.

13. The apparatus of claim 8, wherein the CSI Doppler frequency is calculated using a complex ambiguity function.

14. The apparatus of claim 8, wherein the OFDM symbols transmitted on OFDM subcarrier signals are estimated as $$\hat{a}_{m,n} = Q\left(\frac{z_m[n]}{\hat{c}_{m,n}}\right),$$

wherein $$Q\left(\frac{z_m[n]}{\hat{c}_{m,n}}\right)$$

represents quantizing $$\left(\frac{z_m[n]}{\hat{c}_{m,n}}\right)$$

to a nearest point in the signal space and where $\hat{c}_{m,n}$ is the estimated CSI.

15. A computer program product comprising a non-transitory computer storage medium storing code executable by a processor to perform:
receiving a combined signal comprising a target signal reflected by a target and a transmitter signal not reflected by the target, wherein the transmitter signal is comprised of a plurality of orthogonal frequency division multiplexing (OFDM) subcarrier signals;
calculating a signal Fourier transform for the combined signal to obtain the complex symbols $Z_m[n]$, where where n is the pilot subcarrier index, m is an OFDM symbol index;
estimating a sequence of channel state information (CSI) $c_{m,n}$ for pilot indices of the pilot subcarrier index for the OFDM subcarrier signals of the combined signal as $$\hat{c}_{m,n} = \left(\frac{z_m[n]}{\text{pilot}_m(n)}\right);$$

estimating CSI over for non-pilot OFDM subcarriers of the combined signal to obtain CSI for a sequence of M OFDM symbols;
computing a CSI Fourier transform for the sequence of CSI for a plurality of OFDM subcarriers;
estimating a mean Fourier transform by averaging the CSI Fourier transform of the CSI over at least one OFDM subcarriers;
estimating a CSI Doppler frequency by matching a central lobe template of a Fourier transform to the CSI Fourier transform indicating stationary components, and wherein a side lobe template is matched to side lobes of the Fourier transform indicative of Doppler frequency components; and
computing each of a target position and a target velocity vector for the target within a field of interest from the CSI Doppler frequency.

16. The computer program product of claim 15, wherein the target position and/or the target velocity vector are determined based on the equation:

$$f_{d,i,j}(x(t), y(t), v_x(t), v_y(t)) =$$

$$-\frac{f_c}{c}\left[(v_x(t), v_y(t))\cdot \begin{pmatrix} \frac{(x(t), y(t)) - (x_{T,i}(t), y_{T,i}(t))}{\|(x(t), y(t)) - (x_{T,i}(t), y_{T,i}(t))\|} + \\ \frac{(x(t), y(t)) - (x_{R,j}(t), y_{R,j}(t))}{\|(x(t), y(t)) - (x_{R,j}(t), y_{R,j}(t))\|} \end{pmatrix} - \right.$$

$$(v_{T,i,x}(t), v_{T,i,y}(t))\cdot \frac{(x(t), y(t)) - (x_{T,i}(t), y_{T,i}(t))}{\|(x(t), y(t)) - (x_{T,i}(t), y_{T,i}(t))\|} -$$

$$\left. (v_{R,j,x}(t), v_{R,j,y}(t))\cdot \frac{(x(t), y(t)) - (x_{R,j}(t), y_{R,j}(t))}{\|(x(t), y(t)) - (x_{R,j}(t), y_{R,j}(t))\|}\right]$$

$$i = 1, 2, \ldots, I, j = 1, 2, \ldots, J.$$

wherein $f_{d,i,j}$ denotes Doppler frequency determined at receiver j from a signal transmitted at transmitter i, and wherein x (t) and y (t) are a position of the target at time t, $x_{Rj}(t)$ and $y_{Rj}(t)$ are a position of a receiver j at time t, $x_{T,i}(t)$ and $y_{T,i}(t)$ are a position of a transmitter i at time t, $v_x(t)$ and $v_y(t)$ are a velocity of the target (105) at the time t, fc is a carrier frequency of the combined signal (106).

17. The computer program product of claim 15, wherein the central lobe is offset by a carrier offset frequency.

18. The computer program product of claim 15, wherein the match between the frequency interval and the estimated frequency interval is identifyied using an extended Kalman filter.

19. The computer program product of claim 15, wherein the CSI Doppler frequency is refined using a Viterbi algorithm.

20. The computer program product of claim 15, wherein the CSI Doppler frequency is calculated using a complex ambiguity function.

* * * * *